US012737186B2

(12) United States Patent
Porterfield et al.

(10) Patent No.: US 12,737,186 B2
(45) Date of Patent: Sep. 15, 2026

(54) SCHEDULE INSTRUCTIONS OF A PROGRAM OF DATA FLOWS FOR EXECUTION IN TILES OF A COARSE GRAINED RECONFIGURABLE ARRAY

(71) Applicant: Micron Technology, Inc., Boise, ID (US)

(72) Inventors: Allan Kennedy Porterfield, Durham, NC (US); Skyler Arron Windh, McKinney, TX (US); Bashar Romanous, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/770,560

(22) Filed: Jul. 11, 2024

(65) Prior Publication Data

US 2024/0362024 A1 Oct. 31, 2024

Related U.S. Application Data

(63) Continuation of application No. 17/705,112, filed on Mar. 25, 2022, now Pat. No. 12,039,335.

(51) Int. Cl.
*G06F 9/30* (2018.01)

(52) U.S. Cl.
CPC ...... *G06F 9/30181* (2013.01); *G06F 9/30043* (2013.01)

(58) Field of Classification Search
CPC ......................... G06F 9/30181; G06F 9/30043
See application file for complete search history.

(56) References Cited

U.S. PATENT DOCUMENTS

| | | | |
|---|---|---|---|
| 6,212,566 | B1 | 4/2001 | Vanhoof et al. |
| 10,698,859 | B2 | 6/2020 | Burger et al. |
| 10,776,115 | B2 | 9/2020 | Burger et al. |

(Continued)

FOREIGN PATENT DOCUMENTS

| | | |
|---|---|---|
| WO | 2023020055 | 2/2023 |

OTHER PUBLICATIONS

Artur Podobas, et al. "A Survey on Coarse-Grained Reconfigurable Architectures From a Performance Perspective." IEEE Access, 2020.

(Continued)

*Primary Examiner* — Michael J Metzger
(74) *Attorney, Agent, or Firm* — Greenberg Traurig

(57) ABSTRACT

Schedule instructions of a program for execution on a coarse grained reconfigurable array having a plurality of tiles operable in parallel. The program identifies data flows through memory locations represented by memory variables and identifies instructions configured to transform data in the data flows. Based on a hardware profile identifying features of the coarse grained reconfigurable array, a scheduler is configured to generate a memory map. The memory map identifies, for each respective memory variable in the program, one of the tiles that contains a memory location represented by the respective memory variable. Based on the memory map reducing possible choices for a brute force search, the scheduler assigns the instructions to the tiles for execution, and determines timing of execution of the instructions in the tiles.

17 Claims, 14 Drawing Sheets

(56) References Cited

U.S. PATENT DOCUMENTS

| | | | |
|---|---|---|---|
| 11,126,433 | B2 | 9/2021 | Burger et al. |
| 11,170,307 | B1 | 11/2021 | Ross et al. |
| 11,507,493 | B1 | 11/2022 | Windh et al. |
| 11,815,935 | B2 | 11/2023 | Windh et al. |
| 12,039,335 | B2 | 7/2024 | Porterfield et al. |
| 2004/0088685 | A1 | 5/2004 | Poznanovic et al. |
| 2008/0244152 | A1 | 10/2008 | Chai et al. |
| 2010/0122105 | A1 | 5/2010 | Arslan et al. |
| 2011/0238948 | A1 | 9/2011 | Vorbach et al. |
| 2013/0007331 | A1 | 1/2013 | Pechanek et al. |
| 2015/0127935 | A1 | 5/2015 | Choi et al. |
| 2015/0268963 | A1 | 9/2015 | Etsion et al. |
| 2016/0019154 | A1 | 1/2016 | Gooding |
| 2019/0057060 | A1 | 2/2019 | Nicol |
| 2019/0227777 | A1 | 7/2019 | Chofleming, Jr. et al. |
| 2019/0229996 | A1 | 7/2019 | Chofleming, Jr. et al. |
| 2019/0303147 | A1 | 10/2019 | Brewer |
| 2019/0303154 | A1 | 10/2019 | Brewer |
| 2019/0303346 | A1 | 10/2019 | Brewer |
| 2019/0317771 | A1 | 10/2019 | Vembu et al. |
| 2019/0347542 | A1 | 11/2019 | Chen et al. |
| 2020/0133672 | A1 | 4/2020 | Balasubramanian et al. |
| 2021/0081769 | A1* | 3/2021 | Chen .................. G06F 15/7892 |
| 2021/0089349 | A1 | 3/2021 | Etsion et al. |
| 2021/0141571 | A1 | 5/2021 | Lew et al. |
| 2021/0312320 | A1 | 10/2021 | Shah et al. |
| 2021/0373867 | A1* | 12/2021 | Chen ......................... G06F 8/41 |
| 2022/0413742 | A1 | 12/2022 | Vanesko et al. |
| 2023/0305842 | A1 | 9/2023 | Windh et al. |
| 2023/0305848 | A1 | 9/2023 | Porterfield et al. |
| 2023/0306272 | A1 | 9/2023 | Ming Chang et al. |
| 2023/0315415 | A1 | 10/2023 | Windh et al. |

OTHER PUBLICATIONS

Chang, Andre Xian Ming, et al., "Reinforcement learning Approach for Mapping Applications to Dataflow-Based Coarse-Grained Reconfigurable Array." arXiv:2205.13675v1, May 2022.

International Search Report and Written Opinion, PCT/US2023/015808, mailed on Jun. 28, 2023.

International Search Report and Written Opinion, PCT/US2023/014859, mailed on Jun. 27, 2023.

International Search Report and Written Opinion, PCT/US2023/014858, mailed on Jun. 27, 2023.

John Schulman, et al. "Proximal Policy Optimization Algorithms", arXiv:1707.06347v2 [cs.LG] Aug. 28, 2017.

Liu, Dajiang, et al., "Data-Flow Graph Mapping Optimization for CGRA With Deep Reinforcement Learning." IEEE Transactions on Computer-Aided Design of Integrated Circuits and Systems, IEEE, Oct. 2018.

Mirmahaleh, Seyedeh Yasaman Hosseini, et al., "Data Scheduling and Placement in Deep Learning Accelerator." Cluster Computing, Jul. 10, 2021.

Mehdi Hassanpour, et al. "A Survey of Near-Data Processing Architectures for Neural Networks", arXiv:2112.12630v1 [cs.AR] Dec. 23, 2021.

Mirhoseini, Azalia, et al. "Chip placement with deep reinforcement learning." arXiv preprint arXiv:2004.10746(2020).

Oliveira, Westerley C., et al., "Heterogeneous Reconfigurable Architectures for Machine Learning Dataflows." Concurrency and Computation Practice and Experience, John Wiley & Sons, Ltd., Feb. 25, 2022.

Podobas, Artur, et al., "A Survey on Coarse-Grained Reconfigurable Architectures from a Performance Perspective." IEEE Access, Jul. 27, 2020.

Zhou, Yanqi, et al. "Gdp: Generalized device placement for dataflow graphs." arXiv preprint arXiv:1910.01578 (2019).

* cited by examiner

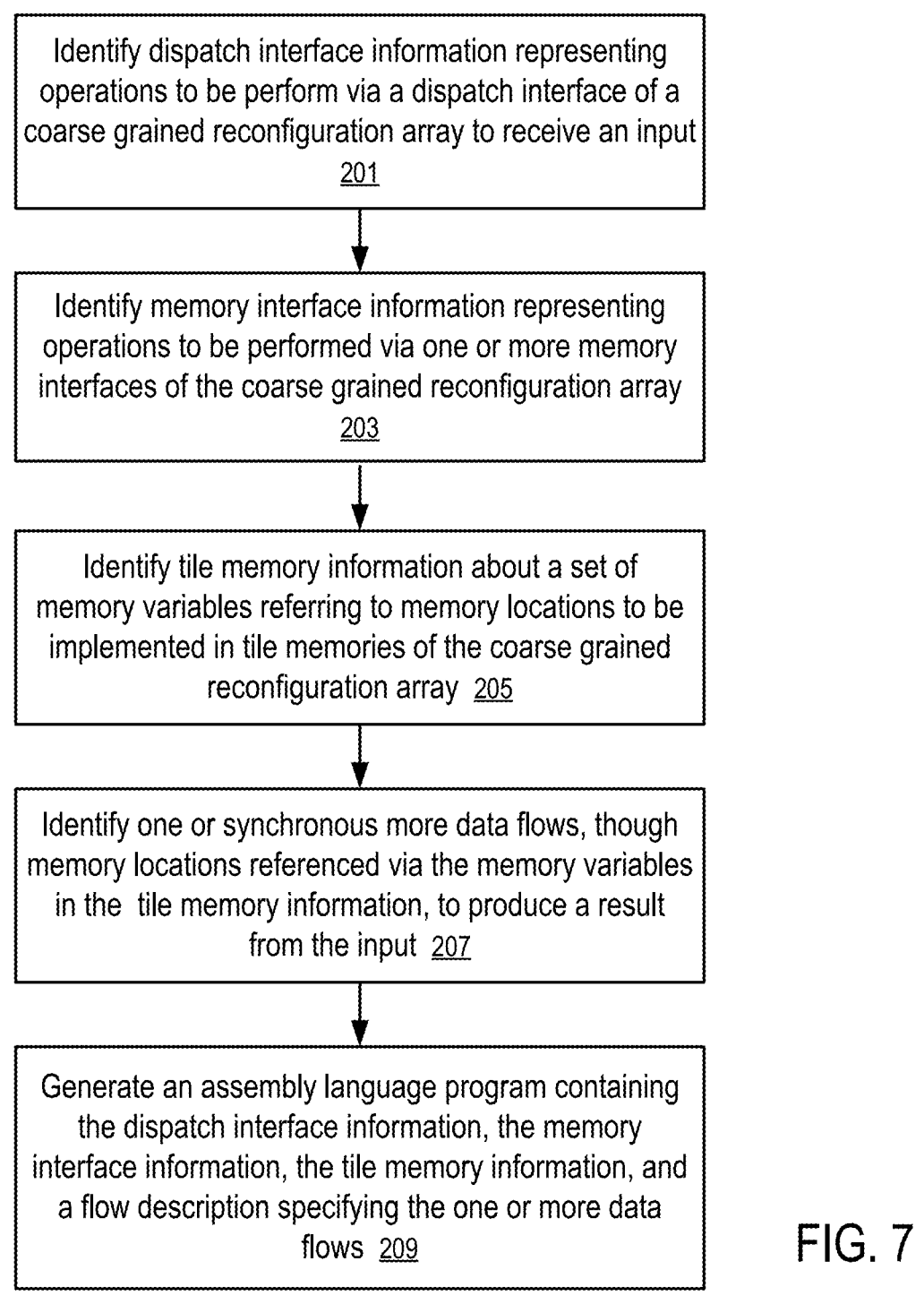

Identify dispatch interface information representing operations to be perform via a dispatch interface of a coarse grained reconfiguration array to receive an input 201

Identify memory interface information representing operations to be performed via one or more memory interfaces of the coarse grained reconfiguration array 203

Identify tile memory information about a set of memory variables referring to memory locations to be implemented in tile memories of the coarse grained reconfiguration array 205

Identify one or synchronous more data flows, though memory locations referenced via the memory variables in the tile memory information, to produce a result from the input 207

Generate an assembly language program containing the dispatch interface information, the memory interface information, the tile memory information, and a flow description specifying the one or more data flows 209

FIG. 7

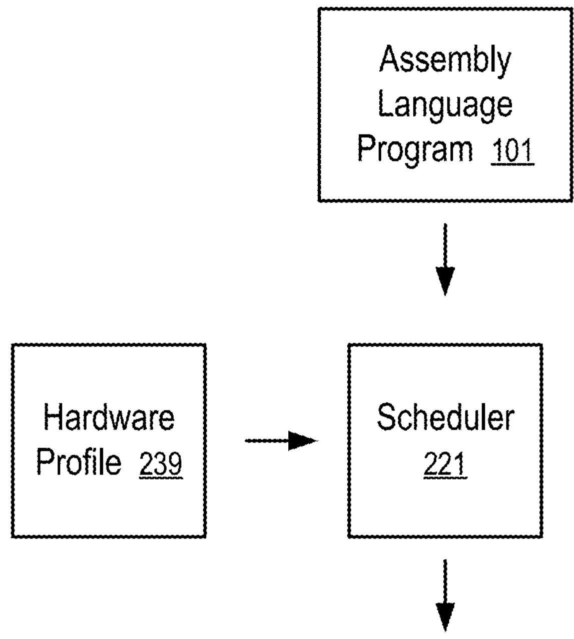
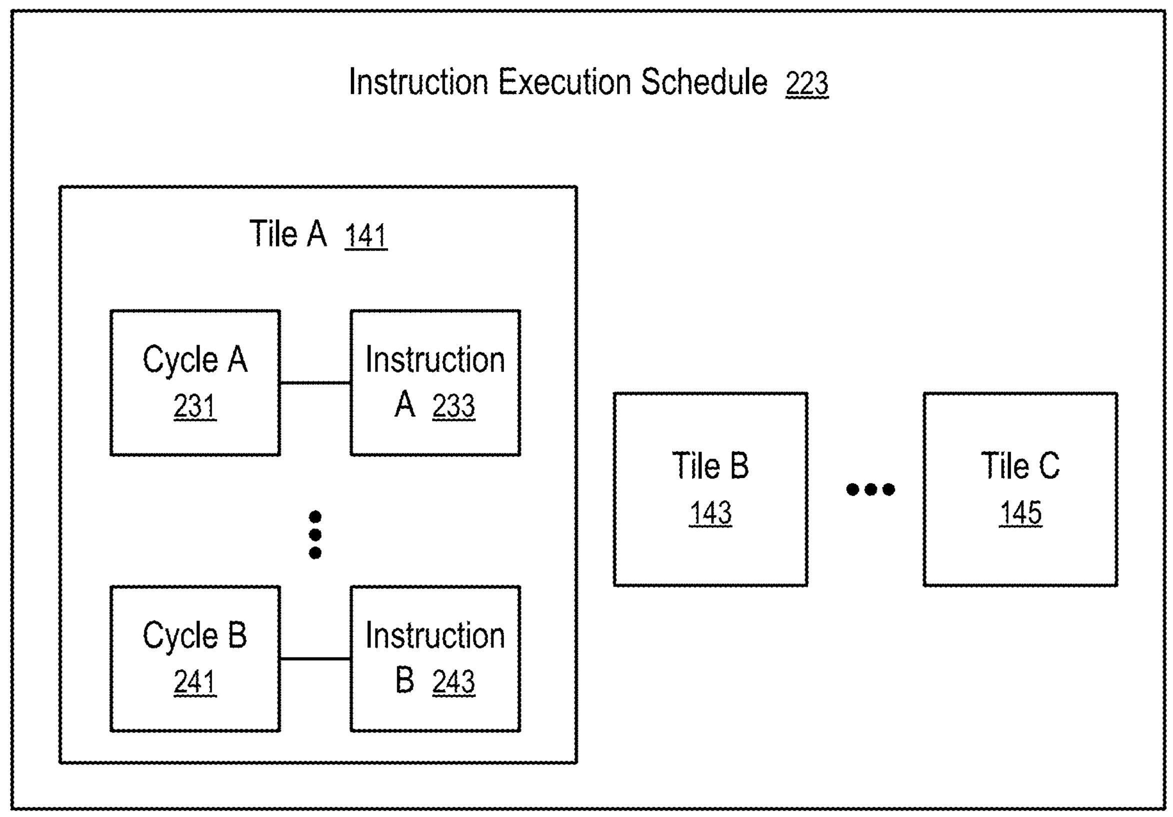
FIG. 8

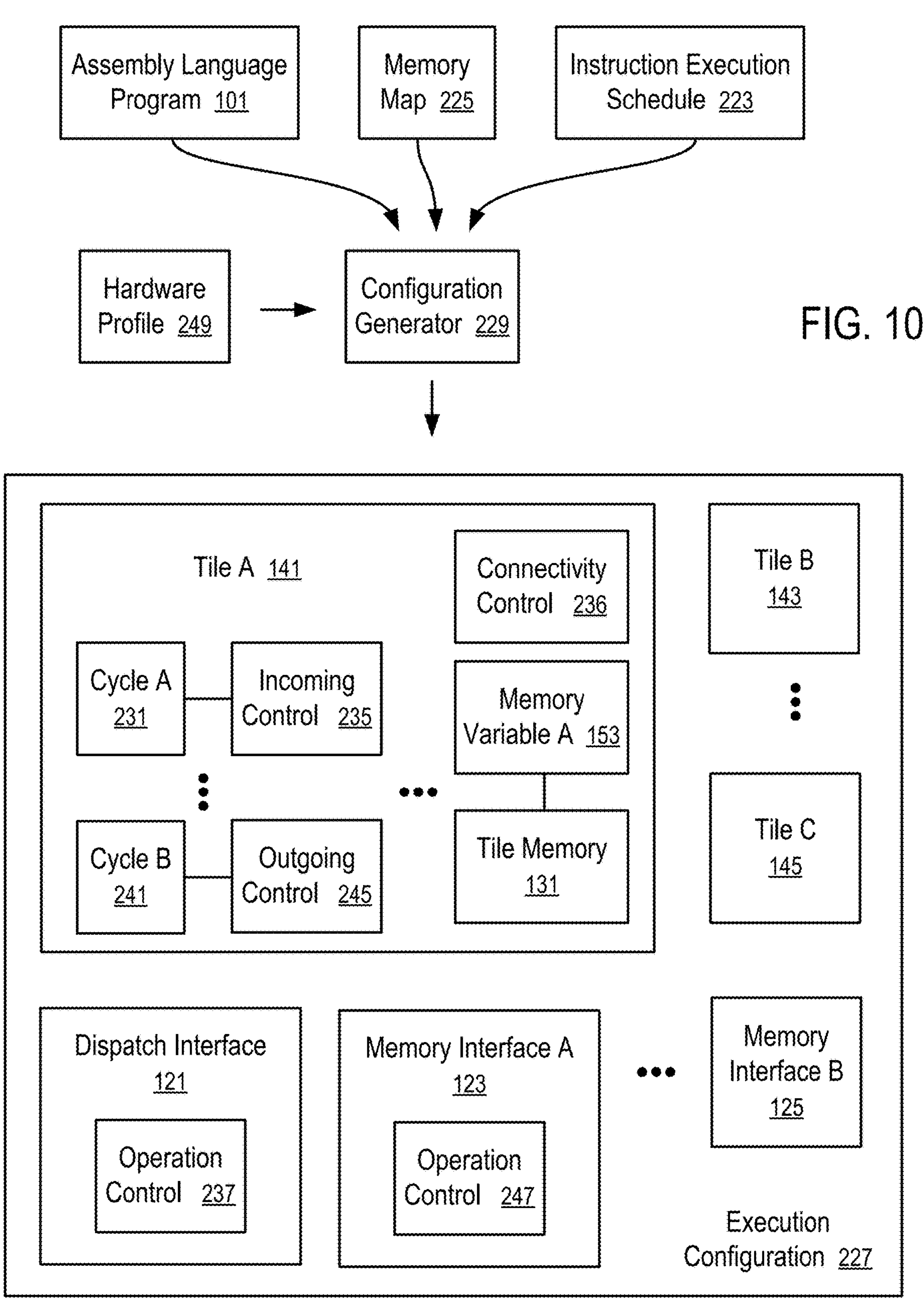
Assembly Language Program 101
Memory Map 225
Instruction Execution Schedule 223
Hardware Profile 249
Configuration Generator 229
FIG. 10
Tile A 141
Connectivity Control 236
Tile B 143
Cycle A 231
Incoming Control 235
Memory Variable A 153
Cycle B 241
Outgoing Control 245
Tile Memory 131
Tile C 145
Dispatch Interface 121
Operation Control 237
Memory Interface A 123
Operation Control 247
Memory Interface B 125
Execution Configuration 227

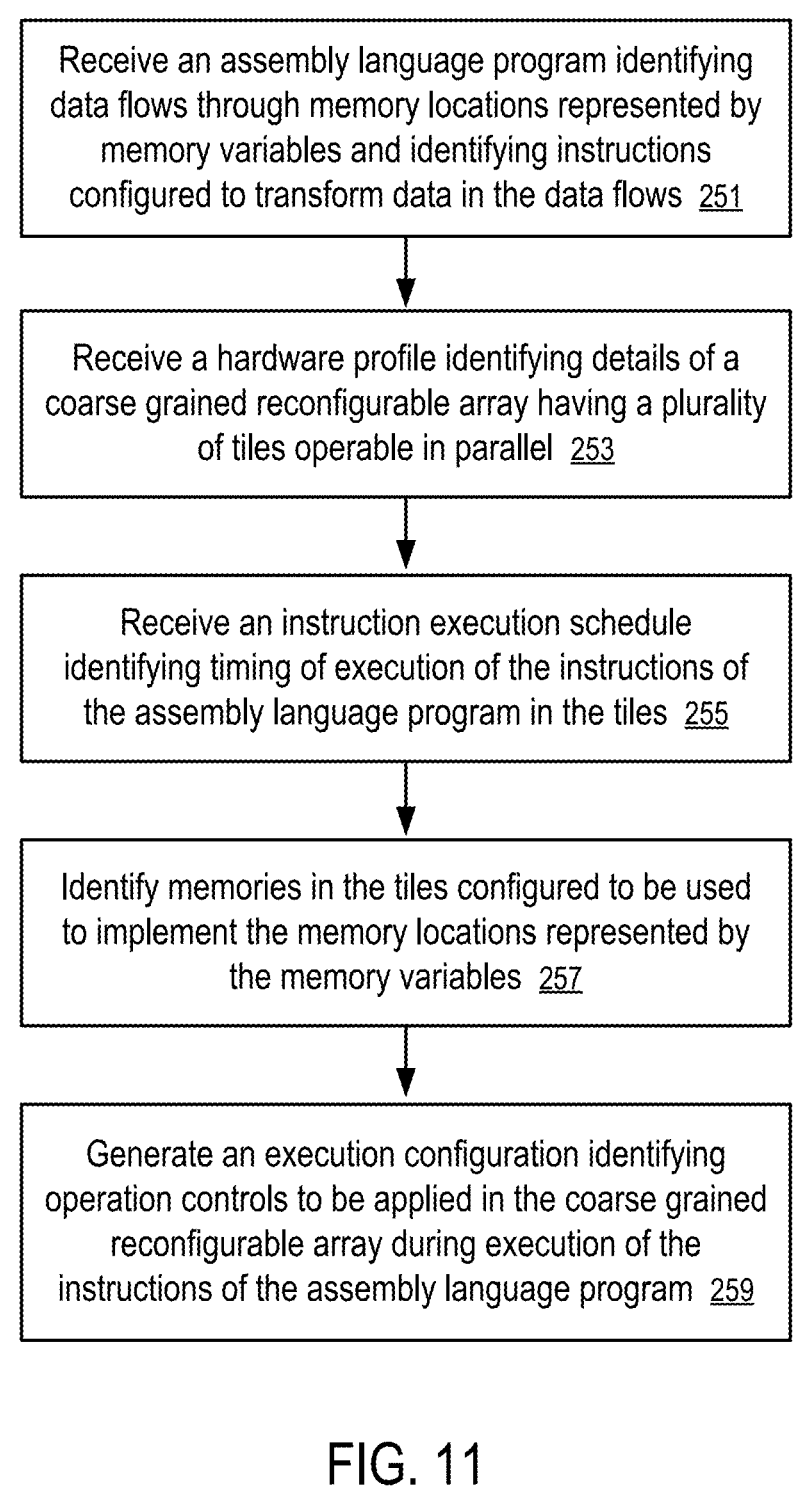

Receive an assembly language program identifying data flows through memory locations represented by memory variables and identifying instructions configured to transform data in the data flows 251

Receive a hardware profile identifying details of a coarse grained reconfigurable array having a plurality of tiles operable in parallel 253

Receive an instruction execution schedule identifying timing of execution of the instructions of the assembly language program in the tiles 255

Identify memories in the tiles configured to be used to implement the memory locations represented by the memory variables 257

Generate an execution configuration identifying operation controls to be applied in the coarse grained reconfigurable array during execution of the instructions of the assembly language program 259

FIG. 11

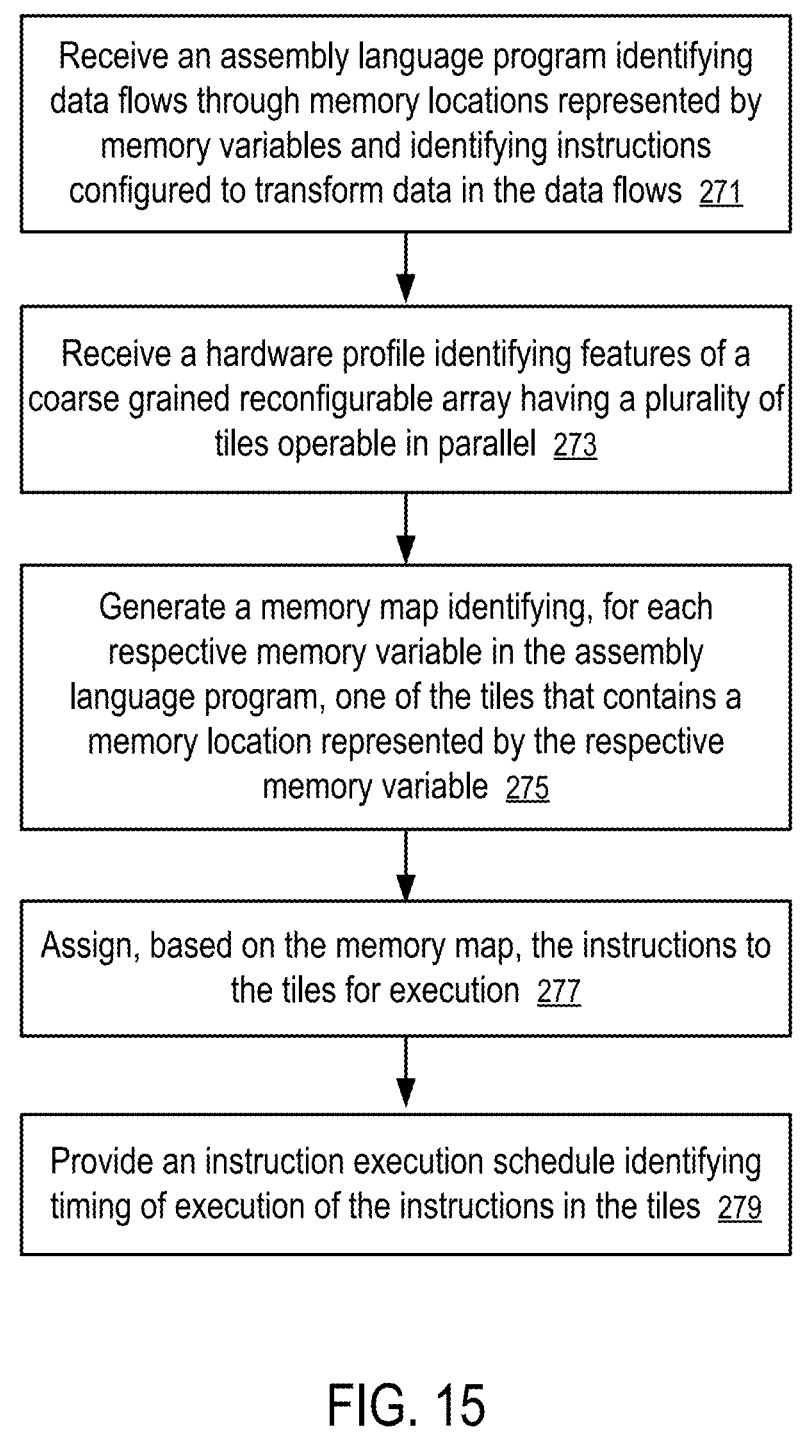

Receive an assembly language program identifying data flows through memory locations represented by memory variables and identifying instructions configured to transform data in the data flows 271

Receive a hardware profile identifying features of a coarse grained reconfigurable array having a plurality of tiles operable in parallel 273

Generate a memory map identifying, for each respective memory variable in the assembly language program, one of the tiles that contains a memory location represented by the respective memory variable 275

Assign, based on the memory map, the instructions to the tiles for execution 277

Provide an instruction execution schedule identifying timing of execution of the instructions in the tiles 279

FIG. 15

SCHEDULE INSTRUCTIONS OF A PROGRAM OF DATA FLOWS FOR EXECUTION IN TILES OF A COARSE GRAINED RECONFIGURABLE ARRAY

RELATED APPLICATIONS

The present application is a continuation application of U.S. patent application Ser. No. 17/705,112 filed Mar. 25, 2022 and issued as U.S. Pat. No. 12,039,335 on Jul. 16, 2024, the entire disclosures of which application are hereby incorporated herein by reference.

TECHNICAL FIELD

At least some embodiments disclosed herein relate to scheduling instructions of a computer program for execution in a computing device in general and more particularly, but not limited to, scheduling the instructions for parallel execution in multiple circuit tiles of the computing device.

BACKGROUND

Traditionally, assembly language programming is based on specifying operations to be performed on data stored in registers. A typical opcode is specified to identify an operation to be performed on data stored in one or more registers identified for the opcode; and the result of the operation is to be stored in a register identified for the opcode.

To execute such a traditional assembly language program, virtual registers referenced in the program are mapped to physical registers in a processor for execution of the program. When there are fewer physical registers than the virtual registers referenced in the program, values are shifted around among the physical registers to implement register reuse and satisfy the virtual register usages in the program.

BRIEF DESCRIPTION OF THE DRAWINGS

The embodiments are illustrated by way of example and not limitation in the figures of the accompanying drawings in which like references indicate similar elements.

FIG. 7 shows a method of specifying operations in a coarse grained reconfigurable array according to one embodiment.

FIG. 8 illustrates an instruction execution schedule generated from an assembly language program according to one embodiment.

FIG. 10 illustrates an execution configuration of a coarse grained reconfigurable array to run an assembly language program according to one embodiment.

FIG. 11 shows a method to identify a configuration of a coarse grained reconfigurable array to run an assembly language program according to one embodiment.

FIG. 15 shows a method to schedule instructions of an assembly language program for execution on a coarse grained reconfigurable array according to one embodiment.

DETAILED DESCRIPTION

Figure 1:
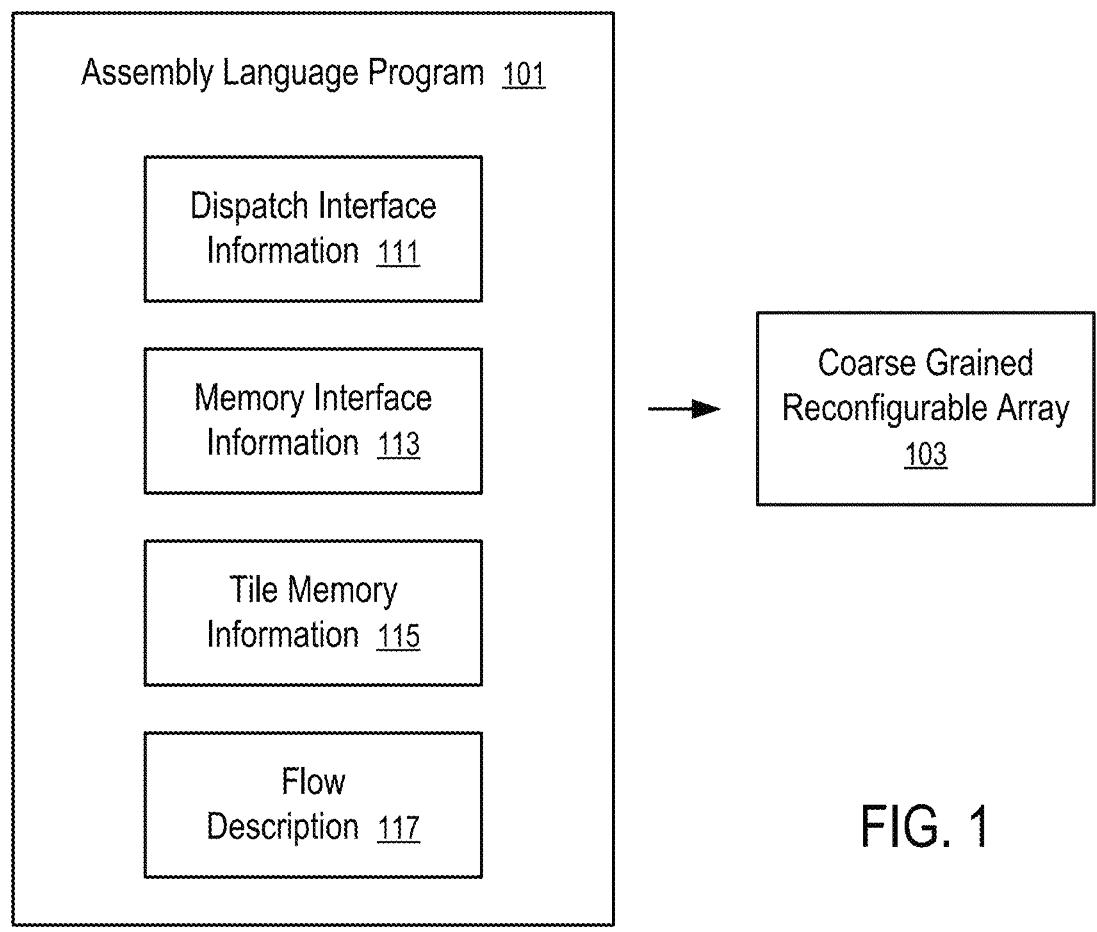
FIG. 1 illustrates the structure of an assembly language program for execution in a coarse grained reconfigurable array according to one embodiment.

At least some embodiments disclosed herein provide techniques of configuring a coarse grained reconfigurable array to run an assembly language program specifying data flows through memory locations represented by memory variables.

compute near memory (CNM) architecture can be used to leverage the dramatic opportunities provided by high performance communication protocols, such as the compute express link (CXL) protocol. Such compute near memory (CNM) architecture can incorporate heterogenous compute elements in a memory/storage subsystem to accelerate various computing tasks near data. An example of such compute elements is a streaming engine (SE) implemented via a coarse grained reconfigurable array (CGRA) having interconnected computing tiles. The tiles are interconnected with both a synchronous fabric (SF) and an asynchronous fabric (AF). The synchronous fabric (SF) can be configured to connect each tile with neighboring tiles that are one or two clock cycles away. The synchronous fabric (SF) interconnects elements within each tile, such as tile memory, multiplexers, and single instruction multiple data (SIMD) units, etc. Tiles can be pipelined through synchronous fabric (SF) to form a synchronous data flow (SDF) through the single instruction multiple data (SIMD) units for operations such as multiply/shift, add/logical operations, etc. Each tile can have a pipelined time-multiplexed processing unit such that a new instruction can start on each tile at every clock cycle. The asynchronous fabric (AF) connects a tile with other tiles, a dispatch interface (DI), and memory interfaces (MIs). The asynchronous fabric (AF) bridges synchronous data flows (SDF) through asynchronous operations, which include initiation of synchronous data flow, asynchronous data transfer from one synchronous data flow to another, system memory accesses, and branching and looping constructs. Each tile can have a delay register to hold its output for outputting with timing alignment with execution of an instruction that uses the output. Together, the synchronous fabric (SF) and asynchronous fabric (AF) allow the tiles to efficiently execute high-level programming language constructs. Simulation results of hand-crafted streaming engine (SE) kernels have shown orders-of-magnitude better performance per watt on data-intensive applications than existing computing platforms.

However, it is challenging to apply traditional compilation tools to program operations of a new architecture, such as streaming engine (SE) implemented using a coarse grained reconfigurable array (CGRA). In a dataflow based coarse grained reconfigurable array (CGRA), a program works by flowing data from one tile to another in a synchronous fashion. This requires instructions to be programmed at an exact cycle on the correct tile to avoid corrupting the synchronous flow of operations. Instead of morphing a dataflow to pretend it is a sequence of register transfers as in traditional assembly, at least some embodiments discussed in the present disclosure use a new assembly language with a corresponding parser that enables describing a program as a group of graphs that represent the data flows.

Configuring a streaming engine (SE) requires finding a synchronous schedule of instructions such that a flow can start for a data element and have every subsequent instruction line-up on a valid tile on the correct cycle. The assembly language of at least some embodiments discussed in the present disclosure is advantageous in the determination of such a synchronous schedule. It can be used to describe some of the configuration details of the hardware as well as the data flow of the computation.

In one embodiment, the assembly language is configured to describe the details of a program for a streaming engine (SE). For example, a dispatch interface (DI) block of the program can be configured to specify information about the dispatch interface of the streaming engine (SE); a memory interface (MI) block can be configured to specify information about memory operations implemented via memory interfaces of the streaming engine (SE); a tile memory (TM) block can be configured to specify information about memory variables to be mapped to tile memories of the streaming engine (SE); and a flows block can be configured to specify a group of graphs representative of the synchronous data flows.

Optionally, a user describes the computation to be performed by a streaming engine (SE) in terms of configuration details specified using the dispatch interface (DI) block, the memory interface (MI) block, and tile memory (TM) block, and the program details via the flows block. Such an assembly language program can be parsed, mapped, and lowered by a software tool into a program execution configuration of the streaming engine in running the assembly language program.

Optionally, a compiler can be used to automate the conversion of a computer program written in a high-level programming language to the assembly language program according to the present disclosure.

The disclosed techniques of assembly language programs have various advantages. For example, representing configuration and data flow allows the assembly language programs to reflect the device state. For example, programming data flows allows a programmer to work in terms of how data is moving between operations instead of how to schedule the hardware details between tiles. For example, breaking code into separate synchronous flows allows the programmer to explicitly define the asynchronous messaging that happens between synchronous elements. For example, programming the device at the abstract representation of assembly language is much faster than working at the low-level details of specifying operations of the multiplexers and tile connections. For example, a parser can provide friendlier error messaging for typos and inconsistent logic instead of debugging why the device simulation didn't terminate or provided incorrect answers. For example, defining an assembly language opens future possibilities of leveraging mainstream compiler tools to compile high level code down to this more abstract description of the device. For example, since programs are lists of instructions, high and low-level knobs can be provided to the programmer through instruction representation. For example, a low-level type of instruction allows the programmer to specify individual fields/opcodes that end up in the instruction; or, a high-level format in terms of operations instead of fields can be used.

An assembly language program describing data flows can be mapped for execution on a specific coarse grained reconfigurable array (CGRA). The coarse grained reconfigurable array (CGRA) can have a particular structure, e.g., a number of tiles and memory interfaces, and particular interconnectivity of synchronous fabric (SF) and/or asynchronous fabric (AF) among the tiles. Such a particular structure can be specific to the coarse grained reconfigurable array (CGRA) that is to be used in execution of the program and thus not reflected in the assembly language program. On the other hand, the assembly language program is shielded from such details and thus can be mapped for execution on different coarse grained reconfigurable array (CGRA) having different structural details.

A scheduler can map the instructions of the assembly language program for execution in tiles of a coarse grained reconfigurable array (CGRA). Since each tile can have a pipelined time-multiplexed processing unit, a new instruction can start on each tile at every clock cycle. Thus, the scheduler can generate a schedule specifying which instruction is programmed on which tile for execution at which clock cycle. The scheduler can determine the tiles and clock cycles of the instructions being mapped in a correct combination such that the data flows in the coarse grained reconfigurable array (CGRA) propagate with proper timing. For example, outputs of tiles are produced at proper clock cycles to be provided in time, through the synchronous fabric (SF), and/or the asynchronous fabric (AF), as inputs for further processing in the tiles. As the instructions are mapped to the tiles, the memory variables used by the instructions are also mapped to memories in the tiles.

Based on the schedule of the instructions for execution in the tiles, a software tool (e.g., a lowering program) can be configured to generate an execution configuration of the coarse grained reconfigurable array for running the assembly language program. The software tool can determine the details on how to configure each connection between tiles. The software tool can determine the low-level details of dividing the tile memory into regions to implement the memory variables mapped to the tiles. The software tool can determine the settings of the correct multiplexer bits in the tiles to ensure data flows correctly at the correct clock cycle within the tiles. The entire program can break/corrupt for having even one missing bit. The details determined by the software tool can be specified in the execution configuration to control the execution of the assembly language program in the coarse grained reconfigurable array (CGRA).

For example, according to the assembly language program and the schedule, the software tool can walk the dataflow graph to trace which operations will be the master control of the successor operations. As it traces the graph, it can set the outgoing control for the current tile operation; and as it traverses to a child, it can set the incoming control information on the cycle it arrives. Control settings can also be determined and set for data passing through routes used on the tiles as well as delay registers.

The software tool can also use the dispatch interface information and the memory interface information provided in the assembly language program to configure operations of the dispatch interface and memory interfaces of the coarse grained reconfigurable array (CGRA). The assembly language program specifies high-level details about the messaging generated by the dispatch interface and memory interfaces. Using the schedule the software tool can identify the messaging in terms of physical hardware locations in the coarse grained reconfigurable array (CGRA).

The software tool has various advantages. Manual generating the execution configuration of a coarse grained reconfigurable array (CGRA) is a monotonous, laborious, error-prone process that can take dozens of man-hours for even simple problems. The software tool automates the work to allow easy verification of hardware constraints. If hardware timing details change, the software tool can rerun with changes in parameters to generate a new execution configuration. The design of such a software tool configured to receive the schedule generated by a scheduler as an input allows the offload many hardware details out of the scheduler, such that implementation of different mapping strategies for the scheduler can focus on instruction placement.

To schedule instructions for execution on tiles of a coarse grained reconfigurable array (CGRA), it is possible to use a brute force approach to explore all of the possible choices of instructions placement and scheduling, and then select a best performing schedule. However, there are a huge number of possible choices in the search space, resulting from a combinatorial explosion of choices.

For example, a delay register of a tile can be used to implement a selected number of delays to synchronize output timing and input timing. As a result, the delay register introduces a number of possible choices that can be multiplied by other choices to increase the possible choices. For example, a tile can have multiple tile memories available to implement a memory variable; and the memory variable can be implemented in one of the tiles of the coarse grained reconfigurable array (CGRA). Thus, there are many possible choices for the implementation of one memory variable; and the possible implementations of a number of memory variables can increase dramatically as the number of memory variables increases. The combination of implementing which variables on which portion of which tile memory of which tiles and scheduling which instruction for which execution on which tile at which clock cycle can lead to a huge search space.

In one embodiment, the search space to be explored by a brute force approach is reduced by performing selections prior to searches. The selections reduce the search space and improve the efficiency in obtaining a valid schedule.

For example, a scheduler can be configured to determine, before starting the brute force search, an allocation of memory variables to tile memories subject to some constraints. The allocation represents a distribution of memory variables of the program to tiles for implementation using tile memories of the respective tiles. For example, such an allocation can be performed with an aim to balance the number of instructions/variables per tile. Further, certain hardware details can be considered in the determination of the allocation (e.g., placing neighbors in data flow on tiles close to each other). Determining the allocation before scheduling instructions can reduce the combinatorial number of choices to be explored by the brute force search.

For example, an instruction can be placed in the tile in which memory variables used by the instruction are implemented. Thus, determining a memory allocation prior to a search can reduce the choices in scheduling an instruction; and the instruction can be scheduled without having to explore possible choices associated with other tiles.

The scheduling of instructions according to one allocation of memory variables to tile memories can be performed independent on the scheduling of instructions according to another allocation. Thus, parallel searches can be performed based on different memory allocations. A resulting schedule having the best score (e.g., based on performance in latency, and/or power, etc.) can be used.

In one embodiment, a valid schedule is to satisfy certain constraints. For example, instructions that share one or more tile memory variables should be placed on a same tile; no instructions each starting a synchronous flow may be placed on a same tile; and/or no multiple sibling instructions may be placed on a same tile, etc. The constraints can be considered by the scheduler in making selections that reduce choices to be exploited using a brute force approach.

For example, a scheduler can partition the instructions of a program into a target number of instruction groups. The target number can be equal to, or more than the number of synchronous data flows specified in the program. Each of the instruction groups is selected to be scheduled on a tile; and the instruction groups are selected to meet the constraints to be satisfied by a valid schedule.

Further, the partitioning of the instructions of the program into instruction groups can be performed to satisfy additional requirements. For example, the partitioning of the instructions of the program can be performed to balance the instruction groups to have a similar number of instructions per group, and/or balance memory usages of the instruction groups to have a similar total tile memory utilization per group, etc. Further, within each instruction group, tile memory variables are distributed to tile memory region(s) without exceeding tile memory region size, without creating a tile memory access conflict for any instruction, etc.

After the partitioning of the instructions of the program into groups, the scheduler can schedule the instructions of each group and their corresponding tile memories on a tile of the coarse grained reconfigurable array (CGRA) to generate a schedule.

In general, a program can be partitioned in different ways into different sets of instruction groups. Scheduling different sets of instruction groups can be performed in parallel to generate different schedules. The performance scores of the resulting schedules can be evaluated (e.g., based latency, and/or energy consumption, etc.) to select a best performing schedule as the output.

In some embodiments, a tile of a coarse grained reconfigurable array (CGRA) can have multiple instruction slots for pipelined execution. To schedule an instruction in a tile, the scheduler determines a slot of the tile to schedule the instruction for execution. The schedule of the instruction is selected to have valid timing and slot configurations for the instruction, the prior instructions that have been scheduled before the instruction, and the subsequent instructions that are scheduled after the instruction.

For example, the scheduler can be configured to perform the operation of scheduling one instruction recursively. For a current instruction selected for scheduling, the scheduler can search for parameters (e.g., slot and/or clock cycle) of the schedule of the current instruction in order to produce a valid schedule for the combination of the current instruction and the prior instructions that have been scheduled before the current instruction. If a scheduler finds a schedule that is valid in timing and other constraints for the current instruction and the prior instructions, if any, that have been scheduled before the current instruction, the scheduler proceeds to select a next instruction from the remaining instructions to be scheduled, and then processes the next instruction as a current instruction selected for scheduling, until there is no remaining instruction to be scheduled.

However, if the scheduler determines that there is no valid schedule for the current instruction in view of the prior instructions having been scheduled before the current instruction, the particular schedule of the prior instructions that have been scheduled before the current instruction is invalid. The scheduler can then move back to the previous instruction scheduled before the current instruction and process the previous instruction as a current instruction to be rescheduled. The process can continue until a valid schedule is found for the instruction groups, or it is determined that no valid schedule can be found for the instruction groups.

Using the techniques, the scheduler can produce, within a sensible amount of time, at least one valid schedule for running a program of data flows in a coarse grained reconfigurable array (CGRA). The core function of the scheduler is highly efficient in terms of time complexity because, upon a failure in scheduling, it immediately terminates the call, recovers the previously achieved schedule for a subset of instructions of the program and from it, and continues the search for a new valid schedule for more instructions.

FIG. 1 illustrates the structure of an assembly language program for execution in a coarse grained reconfigurable array according to one embodiment.

In FIG. 1, an assembly language program 101 is configured with dispatch interface information 111, memory interface information 113, tile memory information 115, and a flow description 117.

The dispatch interface information 111 identifies memory variables to accept arguments to be passed as input to the assembly language program 101, and data properties of the arguments. The dispatch interface information 111 can further specify the data proprieties of return value of the assembly language program 101. The dispatch interface information 111 can be used to configure the dispatch interface of a coarse grained reconfigurable array (CGRA) 103 used to implement the assembly language program 101. To execute the assembly language program 101, the memory variables identified in the dispatch interface information 111 are mapped to the tile memories in the coarse grained reconfigurable array (CGRA) 103. Thus, the dispatch interface information 111 specifies the operations of the dispatch interface to store input data to memory locations represented by the memory variables.

The memory interface information 113 identifies memory access operations that are performed in the flow description 117 to access tile memories in the coarse grained reconfigurable array (CGRA) 103. The memory access operations can include operations to store data into memory variables that are used in the flow description 117, and operations to read data from memory variables that are used in the flow description 117. To execute the assembly language program 101, the memory variables identified in the memory interface information are mapped to the tile memories in the coarse grained reconfigurable array (CGRA) 103.

The tile memory information 115 identifies memory variables used in the flow description 117 and access properties of the memory variables. Such memory variables can include the memory variables identified in the dispatch interface information 111 to store arguments or inputs to the assembly language program 101, the memory variables identified in the memory interface information 113, and other memory variables that can be used in synchronous operations of data flows in the flow description 117.

The flow description 117 specifies one or more data flow graphs. Each data flow graph identifies a synchronous flow of data through memory variables mapped to tile memories and synchronous values mapped to connections between tiles; and each data flow graph further identifies the computations (e.g., add, multiplication, bitwise shift, etc.) performed on those values on the tile data path. For example, some memory variables can be identified in dispatch interface information 111, memory interface information 113, tile memory information 115 for synchronous use (e.g., FIFO) or asynchronous use (e.g., dispatch/memory interface) of tile memories and thus for mapping to tile memories in implementations; additional variables can be used in the flow description 117 that may or may not be mapped to tile memories in implementations. For example, a synchronous value used through a FIFO in the flow description 117 is mapped to a tile memory; some variables in the flow description 117 can be mapped to tile memories using a FIFO to satisfy timing requirements in scheduling instructions for execution on tiles of the coarse grained reconfigurable array (CGRA) 103; and it is not necessary to map some variables in the flow description 117 to tile memories. The data flow graph can include identification of memory access operations specified in the memory interface information 113. The memory access operations specified in the memory interface information 113 are implemented via communications over asynchronous fabric (AF) in the coarse grained reconfigurable array (CGRA) 103. In one embodiment, the flow description 117 can have multiple segments, each specifying one data flow. Each data flow can optionally include the identification of a set of asynchronous variables specified in the dispatch interface information 111, the memory interface information 113, and the tile memory information 115. The instructions of a data flow can start execution upon receiving messages indicating the readiness of the data identified by the set of asynchronous variables. Each data flow can be programmed to send an asynchronous message to another data flow (e.g., to start execution of a loop, to continue a flow, to send a data value, etc.). Each data flow may stop with one or more instructions outputting results into asynchronous variables specified in the dispatch interface information 111, the memory interface information 113, and the tile memory information 115. New identifications of data/variables can be used in each data flow to represent data generated within the data flow. Such new variables used within each data flow are transient, since the data represented by the variables are consumed within the data flow and discarded after the execution of the data flow. Thus, asynchronous variable/data in the program 101 refers to the data being stored into a location/variable for use at an unspecified/unknown time when the data is needed; and there is no hardware imposed limitation on the time period between data arrival and data use; in contrast, synchronous variable/data refers to the data being generated for use at a time determined by a synchronous connection in the coarse grained reconfigurable array (CGRA) 103. The instructions in a data flow may not be connected based on the sequence of the instructions written in the flow description. Some instructions are tied to each other based on the data being consumed as input and data being generated as output that may be consumed synchronously, or propagated asynchronously.

Further details about the coarse grained reconfigurable array 103, the dispatch interface information 111, the memory interface information 113, and the tile memory information 115 are provided below in connection with FIG. 3 to FIG. 6.

Figure 2:
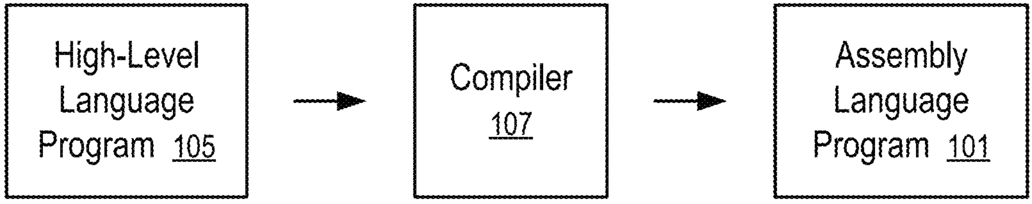
FIG. 2 illustrates the generation of an assembly language program using a compiler according to one embodiment.

FIG. 2 illustrates the generation of an assembly language program using a compiler according to one embodiment.

In FIG. 2, a user can use a high-level language to specify a program 105 of the operations to be performed by a coarse grained reconfigurable array 103. A compiler 107 can read the high-level language program 105 and convert it to the assembly language program 101 of FIG. 1.

Alternatively, the user can write the assembly language program 101 without using a compiler (e.g., 107). For example, a programming/compilation tool can be adapted to receive user inputs to specify the assembly language program 101.

Figure 3:
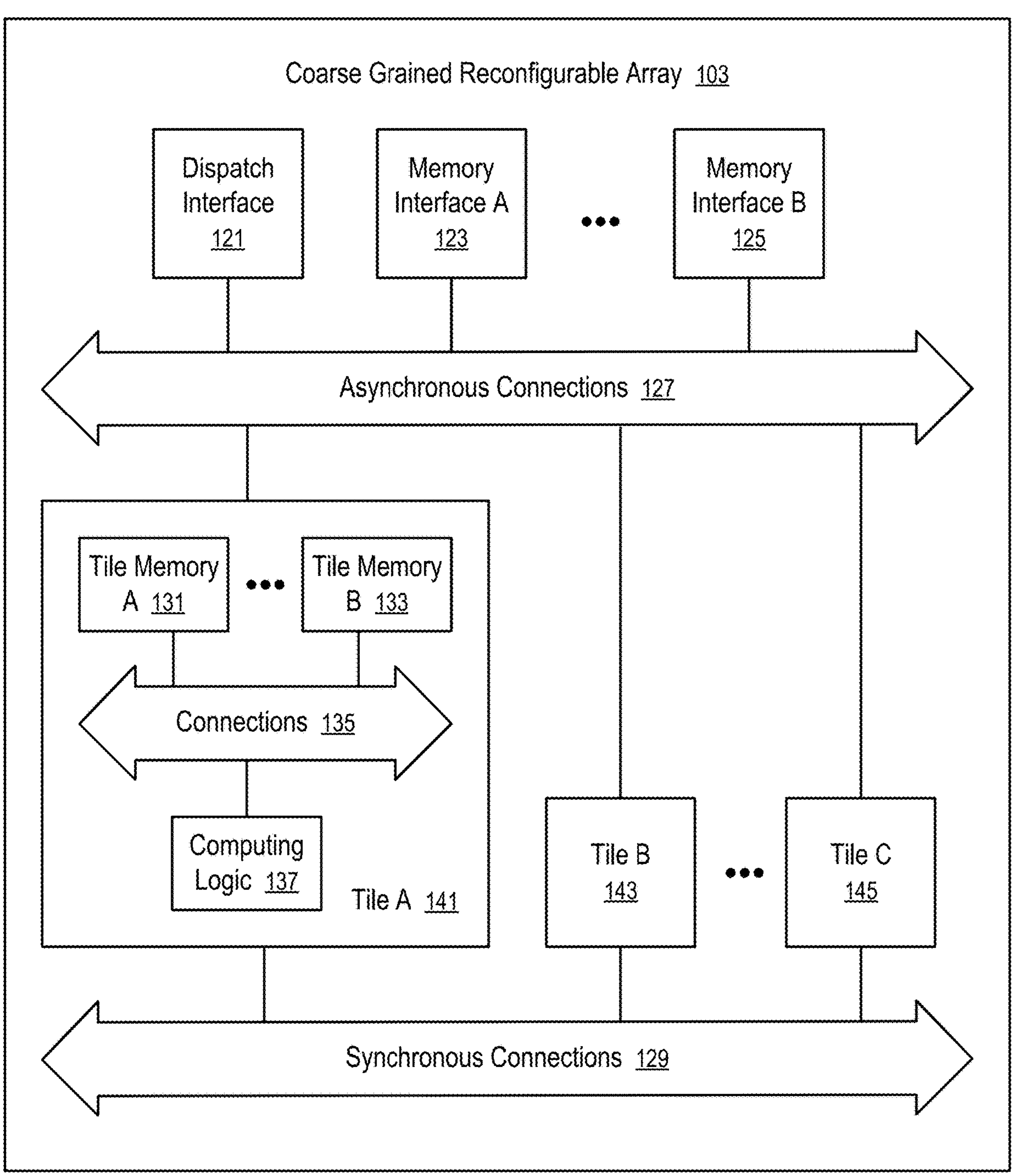
FIG. 3 illustrates a coarse grained reconfigurable array in which an assembly language program according to one embodiment can be configured to specify operations.

FIG. 3 illustrates a coarse grained reconfigurable array in which an assembly language program according to one embodiment can be configured to specify operations.

For example, the assembly language program 101 of FIG. 1 can be implemented for execution in the coarse grained reconfigurable array 103 of FIG. 3.

In FIG. 3, the coarse grained reconfigurable array 103 has a plurality of tiles 141, 143, . . . , 145 that can operate in parallel. The tiles can have the same (or similar) structure.

A typical tile 141 includes tile memories 131, . . . , 133 having synchronous connections 135 with a computing logic 137. The computing logic 137 can be configurable to execute different instructions. For example, the computing logic 137 can include a single instruction multiple data (SIMD) unit. Upon receiving a single instruction, the single instruction multiple data (SIMD) unit can operate on multiple data items in the tile memories 131, . . . , 133. For example, the computing logic 137 can include a pipelined time-multiplexed processing unit that can start execution of a new instruction at every clock cycle. Execution of an instruction can complete after a predetermined number of clock cycles. Results of executing instructions can propagate from one tile (e.g., 141) to a neighboring tile (e.g., 143) via synchronous connections 129 in a predetermined number of clock cycles. Results of executing instructions can also be accessed through memory interfaces (e.g., 123, . . . , 125, and dispatch interface 121) via asynchronous connections 127.

The coarse grained reconfigurable array 103 has synchronous connections 129 among some pairs of the tiles 141, 143, . . . , 145. For example, the synchronous connections 129 offer a direct connection between tile 141 and tile 143, but no direct connection between tile 143 and tile 145. For example, the synchronous connections 129 can connect neighboring tiles (e.g., 141, 143) to form a chain or pipeline among the tiles 141, 143, . . . , 145.

The coarse grained reconfigurable array 103 has asynchronous connections 127 between the tiles 141, 143, . . . , 145 and memory interfaces 123, . . . , 125 and a dispatch interface 121. The dispatch interface 121 can function as a memory interface. Each memory interface (e.g., 123 or dispatch interface 121) can access the tile memories of one or more tiles through the asynchronous connections 127. Each of the tiles 141, 143, . . . , 145 can have a delay register controllable to provide output of the tile for synchronization with the timing of the execution of a next instruction that uses the output. The dispatch interface 121 can communicate inputs and outputs of the coarse grained reconfigurable array 103 from or to a circuit external to the coarse grained reconfigurable array 103.

The assembly language program 101 of FIG. 1 can be written without the information/details of the specific structure of the coarse grained reconfigurable array 103, such as the number of tiles in the coarse grained reconfigurable array 103, the availability of specific synchronous connections 129 among certain pairs of the tiles 141, 143, . . . , 145, the availability of asynchronous connections 127 between a specific memory interface (e.g., 123) and a specific tile (e.g., 143), etc.

With the details of the coarse grained reconfigurable array 103, the assembly language program 101 of FIG. 1 can be mapped for execution using the tiles 141, 143, . . . , 145. The dispatch interface information 111, the memory interface information 113, and the tile memory information 115 can assist the mapping; and the flow description 117 makes it easier to identify a correct schedule of mapping each instruction to a respective tile at a correct clock cycle such that the coarse grained reconfigurable array 103 correctly performs the operations of the assembly language program 101.

The operations of the coarse grained reconfigurable array 103 can be described and/or scheduled as flows of data among tile memories (e.g., 131, . . . , 133) of tiles (e.g., 141, 143, . . . , 145) through the connections 135, 129, and 127 and the computing logic 137 at various clock cycles. Since the flow description 117 describes the required data flows for the operations of the assembly language program 101, the data flows identified by the flow description 117 can be mapped to the data flows in the coarse grained reconfigurable array 103 for execution.

Figure 4:
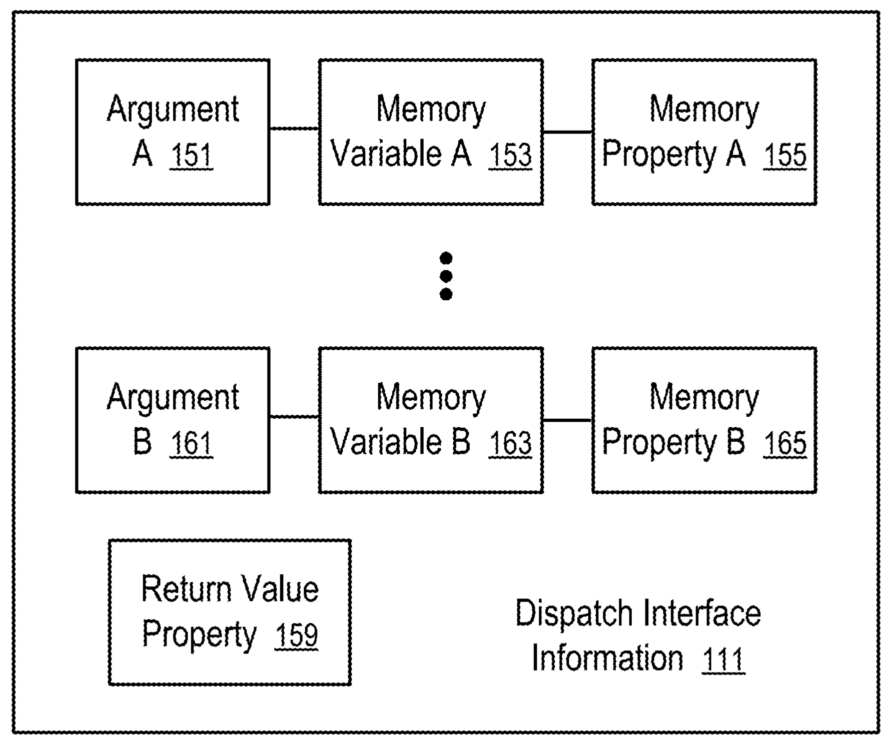
FIG. 4 illustrates dispatch interface information of an assembly language program according to one embodiment.

FIG. 4 illustrates dispatch interface information of an assembly language program according to one embodiment.

For example, the dispatch interface information 111 of FIG. 4 can be used in the assembly language program 101 of FIG. 1.

The assembly language program 101 of FIG. 1 can have a plurality of arguments 151, . . . , 161 to receive inputs to the assembly language program 101. For each of the arguments 151, . . . , 161, the dispatch interface information 111 identifies a memory variable (e.g., 153, or 163) to be mapped into a tile memory (e.g., 131 or 133) and the memory property (e.g., 155 or 165) of the corresponding memory variable (e.g., 153, or 163) (e.g., the property of the input data to be received via the respective argument). A memory property (e.g., 155 or 165) can identify a data type and/or a data size of the input to be received via the corresponding argument (e.g., 151 or 161).

The storing of the input data to the memory locations represented by the memory variables 153, . . . , 163 can be implemented via the operations of the dispatch interface 121 of the coarse grained reconfigurable array 103.

The dispatch interface information 111 can further specify the return value property 159 of the assembly language program 101. For example, the return value property 159 can specify the data type and/or a data size of the value to be returned by the assembly language program 101 upon completion of execution of the assembly language program 101.

Figure 5:
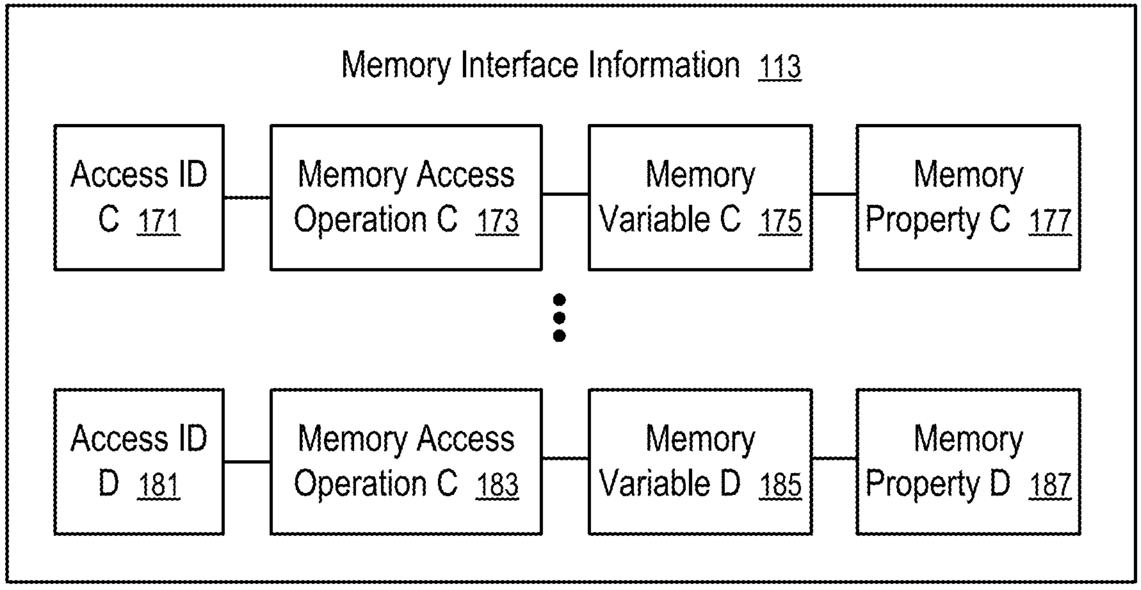
FIG. 5 illustrates memory interface information of an assembly language program according to one embodiment.

FIG. 5 illustrates memory interface information of an assembly language program according to one embodiment.

For example, the memory interface information 113 of FIG. 5 can be used in the assembly language program 101 of FIG. 1.

The memory interface information 113 identifies a plurality of memory access operations 173, . . . , 183. Each memory access operation (e.g., 173 or 183) can be an operation to store data into memory or read data from memory, where the memory location is represented by a memory variable (e.g., 175 or 185) having a corresponding memory property (e.g., 177 or 187) for the data stored or accessed at the memory location. The memory access operations (e.g., 173 or 183) can be implemented via the operations of the memory interfaces 123, . . . , 125 and/or the dispatch interface 121 of the coarse grained reconfigurable array 103.

The memory access operations (e.g., 173 or 183) are associated with access IDs (e.g., 171 or 181) in the memory interface information 113 to represent the corresponding memory access operations (e.g., 173 or 183). The flow description 117 of the assembly language program 101 can use the access IDs (e.g., 171 or 181) to specify the uses of the respective memory access operations (e.g., 173 or 183) in the data flow graphs.

A memory property (e.g., 177 or 187) can identify a data type and/or a data size of the data to be operated upon via the memory access operation (e.g., 173 or 183).

Figure 6:
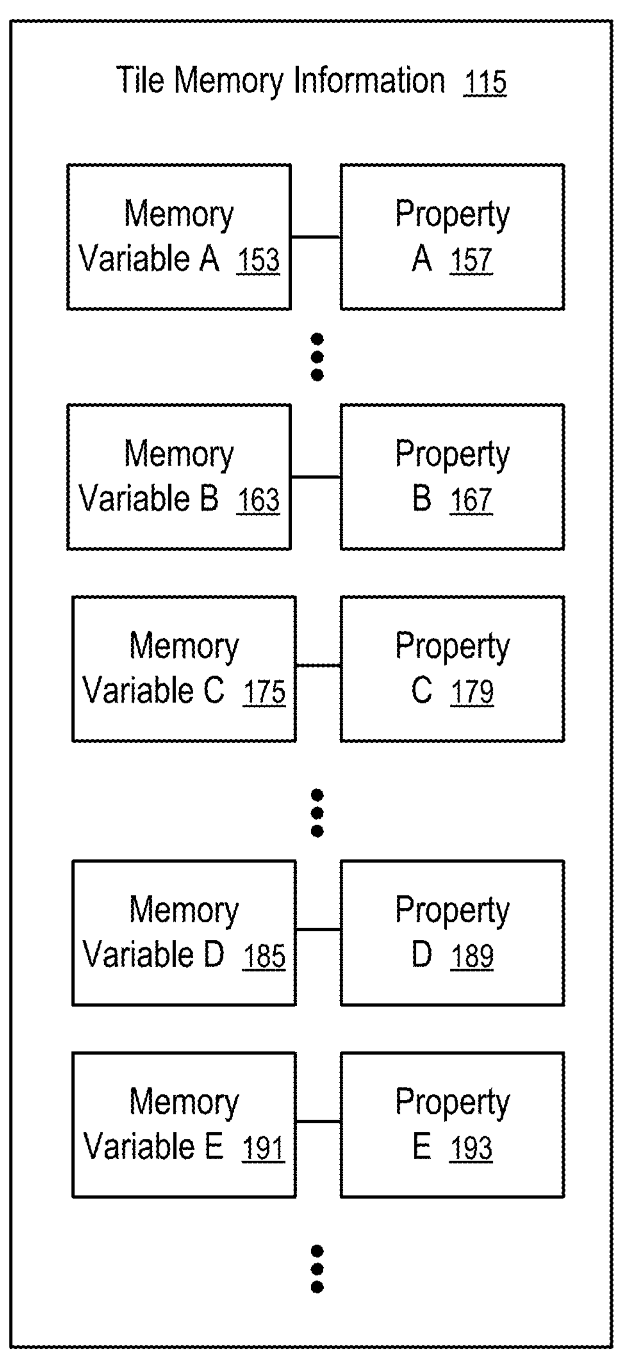
FIG. 6 illustrates tile memory information of an assembly language program according to one embodiment.

FIG. 6 illustrates tile memory information of an assembly language program according to one embodiment.

For example, the tile memory information 115 of FIG. 6 can be used in the assembly language program 101 of FIG. 1.

The tile memory information 115 identifies the properties (e.g., 157, . . . , 167, 179, . . . , 189, 193, . . . ) of the respective memory variables (e.g., 153, . . . , 163, 175, . . . , 185, 191, . . . ) used in the flow description 117 to identify memory locations in tiles of a coarse grained reconfigurable array 103. To execute the assembly language program 101, the memory variables (e.g., 153, . . . , 163, 175, . . . , 185, 191, . . . ) are mapped to tile memories (e.g., 131, . . . , 133) of tiles (e.g., 141, 143, . . . , 145) of the coarse grained reconfigurable array 103.

The properties (e.g., 157, . . . , 167, 179, . . . , 189, 193, . . . ) can identify the memory access types, sizes, etc. of the respective memory variables (e.g., 153, . . . , 163, 175, . . . , 185, 191, . . . ). Examples of memory access type can include unknown, shared, first in first out (FIFO), etc.

The memory variables specified in the tile memory information 115 can include memory variables (e.g., 153, . . . 163) identified in the dispatch interface information 111, memory variables (e.g., 175, . . . , 185) identified in the memory interface information 113, and other memory variables used in the flow description 117 to identify memory locations of data flows. The flow description 117 further identifies operations performed to transform the data along the flows.

FIG. 7 shows a method of specifying operations in a coarse grained reconfigurable array according to one embodiment.

For example, the method of FIG. 7 can be performed by a user, a compiler, or a compilation/programming tool implemented via software and/or hardware in a computing device to generate the assembly language program 101 of FIG. 1.

At block 201, the user, compiler, and/or compilation/programming tool identifies dispatch interface information 111 representing operations to be performed via a dispatch interface 121 of a coarse grained reconfigurable array 103 to receive an input.

For example, the coarse grained reconfigurable array 103 can have a plurality of tiles 141, 143, . . . , 145 interconnected via synchronous connections 129 and 135 and asynchronous connections 127. Each of the tiles (e.g., 141) has tile memories (e.g., 131, . . . , 133) and a reconfigurable computing logic (e.g., 137). In response to an instruction, the computing logic 137 can be reconfigured to perform the operation of the instruction in the flow of data from one memory location to another in the coarse grained reconfigurable array 103.

For example, the dispatch interface information 111 can include identification of first memory variables 153, . . . , 163 for arguments 151, . . . , 161 respectively to indicate the operations of writing the input according to the arguments to the memory locations represented by the first memory variables 153, . . . , 163.

At block 203, the user, compiler, and/or compilation/programming tool identifies memory interface information 113 representing operations to be performed via one or more memory interfaces of the coarse grained reconfigurable array.

For example, the memory interface information 113 can include identification of second memory variables 175, . . . , 185 associated with memory access operations 173, . . . , 183 for storing or retrieving data items to or from memory locations referred to and represented by the second memory variables 175, . . . , 185.

The memory interface information 113 and the dispatch interface information 111 can include the types and sizes of data items identified by memory variables (e.g., 153, 163, 175, 185) and operated upon in the respective memory access operations (e.g., 173, 183, or storing inputs according to the arguments 151, . . . , 161).

At block 205, the user, compiler, and/or compilation/programming tool identifies tile memory information 115 about a set of memory variables (e.g., 153, . . . , 163, 175, . . . , 185, 191, . . . ) referring to memory locations to be implemented in tile memories (e.g., 131, 133) of the coarse grained reconfigurable array 103.

The tile memory information 115 can further identify access types and sizes of the set of memory variables (e.g., 153, . . . , 163, 175, . . . , 185, 191, . . . ) for implementation in the coarse grained reconfigurable array. The set of memory variables (e.g., 153, . . . , 163, 175, . . . , 185, 191, . . . ) can include the first memory variables (e.g., 153, . . . , 163) identified in the dispatch interface information 111, the second memory variables (e.g., 175, . . . , 185) identified in the memory interface information 113, and at least one third memory variable 191 referring to a memory location in one or more data synchronous flows to be implemented via the coarse grained reconfigurable array 103.

At block 207, the user, compiler, and/or compilation/programming tool identifies one or more synchronous data flows, through memory locations referenced via the memory variables (e.g., 153, . . . , 163, 175, . . . , 185, 191, . . . ) in the tile memory information 115, to produce a result from the input. Data can be transformed via execution of instructions along the flows; and the data flows can go through other variables that do not have to be mapped to tile memories.

At block 209, the user, compiler, and/or compilation/programming tool generates an assembly language program 101 containing the dispatch interface information 111, the memory interface information 113, the tile memory information 115, and a flow description 117 specifying the one or more data flows.

For example, a compiler 107 can be configured to compile a computer program 105 written in a high-level language to generate the assembly language program 101.

Alternatively, a compilation/programming tool can be configured to present a user interface to receive user inputs to identify the dispatch interface information 111, the memory interface information 113, the tile memory information 115, and the one or more data flows, etc. Based on the user inputs, the compilation/programming tool can check for errors and generate the assembly language program 101.

Optionally, a compiler and/or a compilation/programming tool can be further configured to map the one or more data flows specified in the assembly language program 101 to flows of data in the coarse grained reconfigurable array 103, including mapping the set of memory variables (e.g., 153, . . . , 163, 175, . . . , 185, 191, . . . ) to tile memories (e.g., 131, 133) in the coarse grained reconfigurable array 103.

FIG. 8 illustrates an instruction execution schedule generated from an assembly language program according to one embodiment.

For example, the instruction execution schedule 223 can be generated from the assembly language program 101 of FIG. 1 for execution in a coarse grained reconfigurable array 103 of FIG. 3 using a scheduler 221 implemented as a software tool.

The assembly language program 101 of FIG. 1 specifies data flows through memory locations represented by memory variables. The data flows have instructions specifying operations to be performed on the data in the flows.

A hardware profile 239 can identify the high level structural features of a coarse grained reconfigurable array 103 to be used to run the assembly language program 101. Such high level structural features can specify to the coarse grained reconfigurable array 103 among possible implementations of coarse grained reconfigurable array. For example, the high level structural features can specify the number of tiles (e.g., 141, 143, . . . 145), the number of memory interfaces (e.g., 123, . . . , 125), the connection topology in the synchronous connections 129 and asynchronous connections 127, numbers of clock cycle delays in the synchronous connections 129 and asynchronous connections 127, etc., in the coarse grained reconfigurable array 103.

The hardware profile 239 has sufficient details to allow a scheduler to map instructions (e.g., 233, 243) in the data flows of the assembly language program 101 into tiles 141, 143, . . . , 145 for execution at proper time instances represented by identification of cycles (e.g., 231, 241).

For best performance, the scheduler 221 can map instructions into different tiles 141, 143, . . . , 145 for execution. Although it is possible to map all instructions of the assembly language program 101 to a single tile (e.g., 143 or 141) for execution, such a schedule is inefficient in failing to utilize the resources in remaining tiles (e.g., 145). The scheduler 221 is configured to distribute instructions to different tiles 141, 143, . . . , 145 for parallel execution for improved performance and a reduced or minimized number of clock cycles to complete the computation of the assembly language program 101.

For example, the scheduler 221 can distribute instructions of different data flows to different tiles. For example, the scheduler 221 can try to place a next instruction to be placed in different tiles and identify a placement that results in a best performance for execution up to the next instruction.

In placing the instructions (e.g., 233, . . . , 243), the scheduler 221 also identifies the clock cycle (e.g., 231, . . . , 241) for the initiation of the execution of the instructions (e.g., 233, . . . , 243) in the tiles (e.g., 141, 143, . . . , 145).

In general, the instruction execution schedule 223 can include a sequence of instruction placement for each of the tiles 141, 143, . . . , 145. For example, a typical tile 141 is assigned to execute instructions 233, . . . , 243 respectively at the clock cycles 231, . . . , 241. The scheduler 221 identifies the cycles 231, . . . , 241 such that the outputs of computations can be used in correct cycles as inputs to subsequent computations. Thus, the data can flow in and among the tiles 141, 143, . . . , 145 for synchronous operations.

Figure 9:
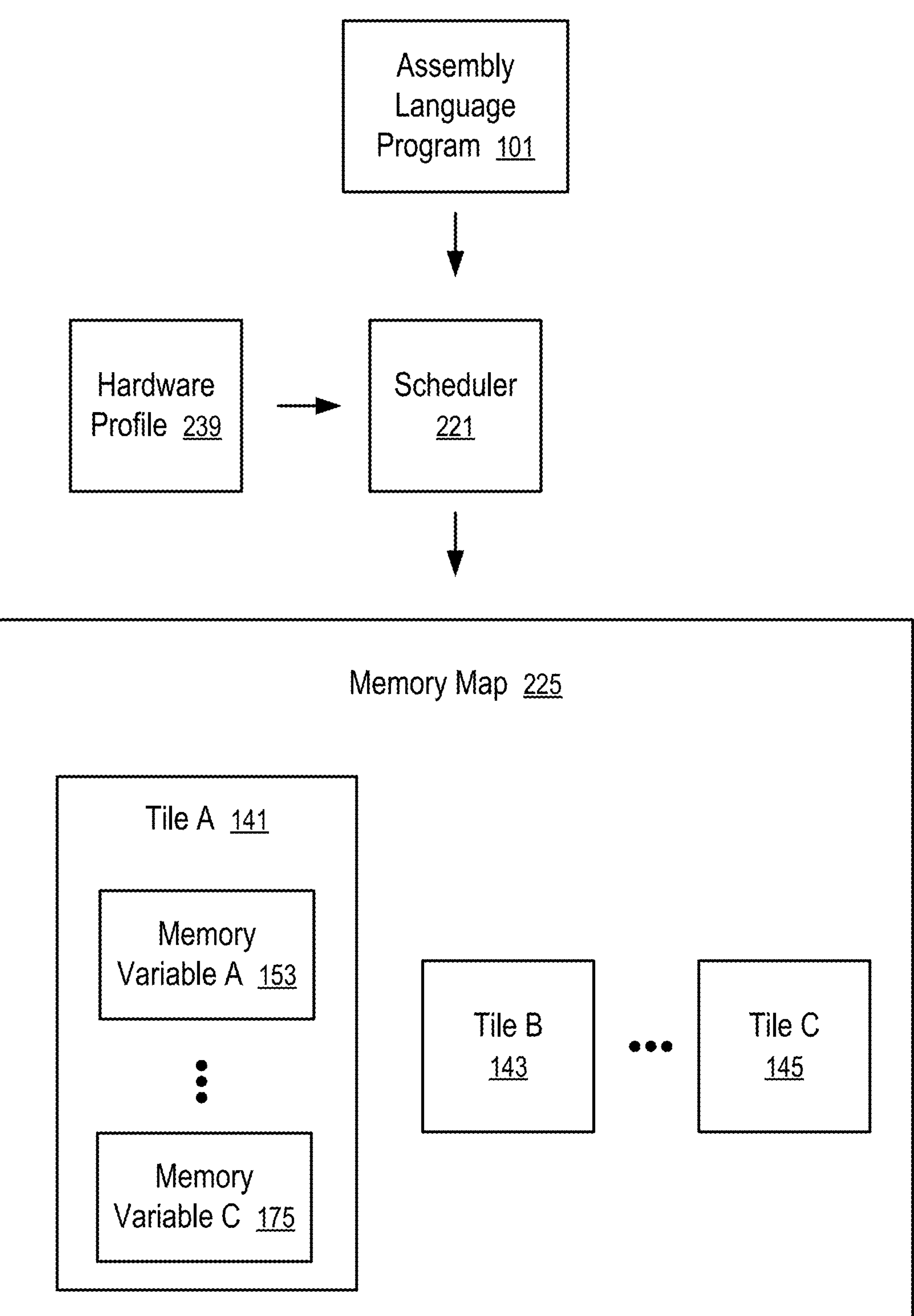
FIG. 9 illustrates a memory map to implement an assembly language program in a coarse grained reconfigurable array according to one embodiment.

Further, the hardware profile 239 allows the scheduler 221 to map the memory variables in the assembly language program 101 into the tiles 141, 143, . . . , 145 for implementation via tile memories (e.g., 131, . . . , 133), as illustrated in FIG. 9.

FIG. 9 illustrates a memory map to implement an assembly language program in a coarse grained reconfigurable array according to one embodiment.

In FIG. 9, the scheduler 221 identifies a memory map 225 for the assembly language program 101 for a coarse grained reconfigurable array 103 having structural features identified in the hardware profile 239.

For example, in a typical tile 141, memory variables 153, . . . , 175 of the assembly language program 101 are mapped in the memory map 225 for implementation via tile memories 131, . . . , 133 of the tile 141. Other memory variables of the assembly language program 101 are mapped to other tiles (e.g., 143, . . . , 145).

When the data stored in a variable (e.g., 153) is mapped to a tile (e.g., 141) for implementation using its tile memory (e.g., 131 or 133), it is typically efficient to map the instructions operating on the data to the same tile (e.g., 141), since accessing the data via connections between tiles can take a longer time than accessing within the tile. Thus, the generation of the memory map 225 and the generation of the instruction execution schedule 223 can be performed together to identify a high performance schedule 223.

Certain hardware details can be excluded from the hardware profile 239 to allow the scheduler 221 to focus on the operation of instruction placement in the tiles 141, 143, . . . , 145. Thus, the scheduler 221 does not determine low level details of configuring the coarse grained reconfigurable array 103 for running the assembly language program 101 according to the schedule 223. Such low level details can include how the dispatch interface 121 and the memory interfaces 123, . . . , 125 are configured for the operations of the assembly language program 101, how the memory locations represented by the memory variables (e.g., 153, 175) are implemented via tile memories (e.g., 131, 133), how the connections (e.g., 135) in the tiles (e.g., 141) are configured to facilitate the correct data flows within the tiles (e.g., 141, 143, . . . , 145), etc. A more detailed hardware profile can be used to generate the configuration to execute the assembly language program 101, as illustrated in FIG. 10.

FIG. 10 illustrates an execution configuration of a coarse grained reconfigurable array to run an assembly language program according to one embodiment.

In FIG. 10, a hardware profile 249 can specify low-level details of the coarse grained reconfigurable array 103. The low-level details may not be in the hardware profile 239 used by the scheduler 221 of FIG. 8 and FIG. 9.

A configuration generator 229 can use the hardware profile 249 to determine an execution configuration 227 for an assembly language program 101 having a memory map 225 and an instruction execution schedule 223.

The execution configuration 227 has detailed information on how to control and/or use the elements of the coarse grained reconfigurable array 103 to run the assembly language program 101.

For example, the memory map 225 specifies which tile (e.g., 141) of the coarse grained reconfigurable array 103 is used to implement the memory represented by a memory variable (e.g., 153). The configuration generator 229 can further determine, for the execution configuration 227, which portion of tile memories (e.g., 131) in the tile (e.g., 141) is used for the memory represented by the memory variable (e.g., 153).

For example, the instruction execution schedule 223 identifies which instruction (e.g., 233) is scheduled to be initiated for execution on which tile (e.g., 141) at which clock cycle (e.g., 231). The configuration generator 229 can further determine the connectivity control 236 for the configuration of the connections 135 in the tile (e.g., 141) to ensure proper flow of data in the tile (e.g., 141) for the execution of the instruction. For example, the connections 135 in the tile (e.g., 141) can be configured via controlling bits for multiplexers in the connections 135; and the connectivity control 236 can identify the controlling bits.

For example, the dispatch interface information 111 of the assembly language program 101 specifies how the dispatch interface 121 is to store inputs received as arguments 151, . . . , 161. After the determination of how the memory variables 153, . . . 163 associated with the arguments 151, . . . , 161 are implemented using which tile memories (e.g., 131, . . . 133) in which tiles (e.g., 141, 143, . . . , 145), the configuration generator 229 can further determine the operation control 237 of the dispatch interface 121 to process inputs.

Similarly, after the determination of the tile memory implementations of the memory variables 175, . . . , 185 identified in the memory interface information 113 of the assembly language program 101, the configuration generator 229 can further determine the operation control (e.g., 247) of the memory interfaces (e.g., 123, . . . , 125) to process memory access operations 173, . . . , 183 identified in the flow description 117 using their access IDs 171, . . . , 181.

For example, the configuration generator 229 can trace the data flows specified in the flow description 117 of the assembly language program 101 and implemented according to the instruction execution schedule 223. When the tracking detects data flowing into a tile (e.g., 141) at a clock cycle 231, the configuration generator 229 identifies the incoming control 235 to be applied to the tile 141 to facilitate data flowing into the tile 141; and when the tracking detects data flowing out of the tile 141 at the clock cycle 241, the configuration generator 229 identifies the outgoing control 245 to be applied to the tile 141 to facilitate data flowing out of the tile 141 (e.g., the timing control of the delay register of the tile 141).

When the coarse grained reconfigurable array 103 is controlled and/or used according to the execution configuration 227, the coarse grained reconfigurable array 103 can run instructions of the assembly language program 101 according to the instruction execution schedule 223 to implement the computation as specified in the assembly language program 101.

FIG. 11 shows a method to identify a configuration of a coarse grained reconfigurable array to run an assembly language program according to one embodiment.

For example, the method of FIG. 11 can be used in a configuration generator 229 implemented as a lowering program to generate an execution configuration 227 of FIG. 10.

At block 251, the configuration generator 229 receives an assembly language program 101 identifying data flows through memory locations represented by memory variables (e.g., 153, . . . , 163, 175, . . . , 185, 191, . . . ) and identifying instructions configured to transform data in the data flows (e.g., as specified in a flow description 117).

At block 253, the configuration generator 229 further receives a hardware profile 249 identifying details of a coarse grained reconfigurable array 103 having a plurality of tiles 141, 143, . . . , 145 operable in parallel.

For example, the coarse grained reconfigurable array 103 can include a plurality of memory interfaces (e.g., 123). One of the memory interfaces can be configured/used as a dispatch interface 121. The coarse grained reconfigurable array 103 has the plurality of tiles 141, 143, . . . , 145 interconnected via synchronous connections 129 and asynchronous connections 127. Each of the tiles can have tile memories (e.g., 131, . . . , 133) and a reconfigurable computing logic 137.

At block 255, the configuration generator 229 further receives an instruction execution schedule 223 identifying timing of execution of the instructions of the assembly language program 101 in the tiles 141, 143, . . . , 145.

At block 257, the configuration generator 229 identifies memories (e.g., 131, . . . , 133) in the tiles (e.g., 141, 143, . . . , 145) configured to be used to implement the memory locations represented by the memory variables (e.g., 153, . . . , 163, 175, . . . , 185, 191, . . . ).

At block 259, the configuration generator 229 generates an execution configuration 227 identifying operation controls (e.g., 235, 245, 236, 237, 247) to be applied in the coarse grained reconfigurable array 103 during execution of the instructions of the assembly language program 101.

For example, the assembly language program 101 includes dispatch interface information 111 representing operations to be performed to store inputs into first memory locations represented by first memory variables 153, . . . , 163. After identifying the tile memories used to implement the first memory locations, the configuration generator 229 can identify, based on the dispatch interface information 111, operating controls 237 of the dispatch interface 121 of the coarse grained reconfigurable array 103 to store the inputs to tile memories identified to implement the first memory locations.

For example, the assembly language program 101 includes memory interface information 113 representing operations to be performed to store or retrieve data at or from second memory locations represented by second memory variables 175, . . . , 185. After identifying the tile memories used to implement the second memory locations, the configuration generator 229 can identify, based on the memory interface information 113, operating controls 247 of the memory interfaces (e.g., 123 or 125) of the coarse grained reconfigurable array 103 to store or retrieve data at or from tile memories identified to implement the second memory locations.

For example, the assembly language program 101 has a flow description 117 specifying the data flows. The configuration generator 229 can trace the data flows in connection with identification of the timing of execution of the instructions to identify timing of controls (e.g., 235, 245, 236, 237, 247) to be applied in the tiles during execution of the assembly language program 101.

For example, during the tracing of the data flows, the configuration generator 229 can detect an instance of data flowing into a first tile (e.g., 141) of the coarse grained reconfigurable array 103. In response, the configuration generator 229 can identify incoming controls 235 to be applied to the first tile 141 and the timing (e.g., cycle 231) of the incoming control 235 during execution of the assembly language program 101 in the coarse grained reconfigurable array 103.

For example, during the tracing of the data flows, the configuration generator 229 can detect an instance of data flowing out of the first tile 141 of the coarse grained reconfigurable array 103. In response, the configuration generator 229 can identify outgoing controls 245 to be applied to the first tile 141 and timing (e.g., cycle 241) of the outgoing controls during the execution of the assembly language program 101 in the coarse grained reconfigurable array 103.

For example, during the tracing of the data flows with tiles, the configuration generator 229 can identify connectivity controls 236 of the tiles 141, 143, . . . , 145 for data flowing within the tiles according to the instruction execution schedule 223. For example, each respective tile (e.g., 141) among the tiles has internal connections 135 between tile memories 131, . . . , 133 and a computing logic 137. After the determination of the tile memories implementing the memory variables in the assembly language program 101, the configuration generator 229 can determine the connectivity among the tile memories (e.g., 131, . . . , 133) and the computing logic 137 to facilitate the data flows within the tiles (e.g., 141). The internal connections 135 can include multiplexers to control data paths; and the connectivity controls 236 can include setting bits to control the multiplexers to implement the data flows.

After the determination of the execution configuration 227, the coarse grained reconfigurable array 103 can be controlled according to the content of the execution configuration 227 during execution of the instructions of the assembly language program 101 according to the instruction execution schedule 223. The use of the execution configuration 227 ensures the correct operation configuration for running the assembly language program 101. Different schedules (e.g., 223) of the assembly language program 101 as input to the configuration generator 229 can result in different configurations (e.g., 227).

Figure 12:
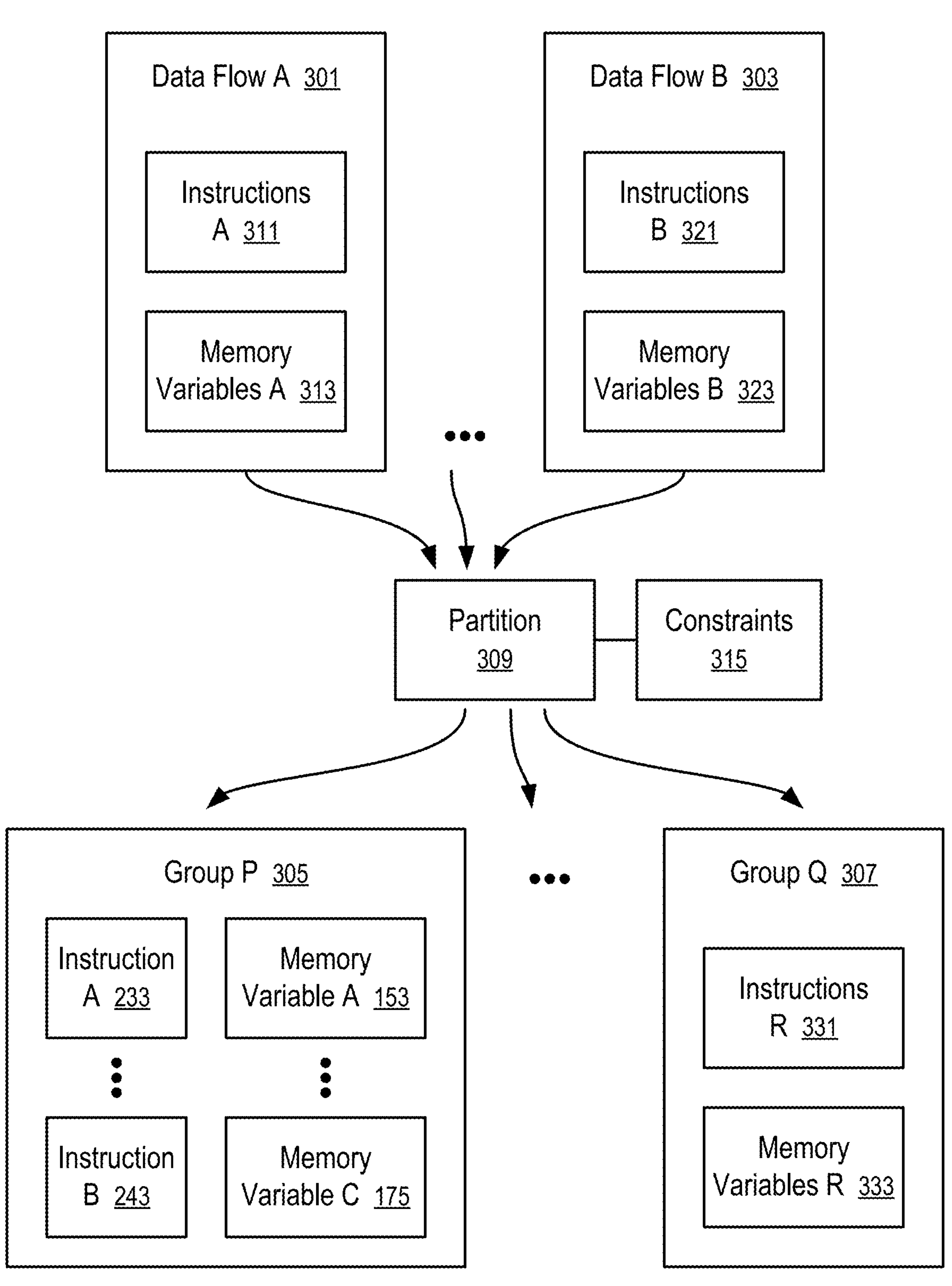
FIG. 12 shows partitioning of instructions of data flows into groups according to one embodiment.

FIG. 12 shows partitioning of instructions of data flows into groups according to one embodiment.

For example, the instructions identified in the flow description 117 of the assembly language program 101 of FIG. 1 can be partitioned into instruction groups according to FIG. 12.

For example, the flow description 117 of the assembly language program 101 of FIG. 1 can list a plurality of data flows 301, . . . , 303.

For example, the data flow 301 specifies a synchronous data flow through memory locations represented by memory variables 313. The data flow 301 further specifies instructions 311 identifying opcodes of operations to be performed upon the data flowing between the memory locations represented by memory variables 313. Similarly, the data flow 303 specifies memory variables 323 and instructions 321.

In FIG. 12, the instructions 311, . . . , 321 and the memory variables 313, . . . , 323 of the data flows 301, . . . , 303 are partitioned 309 to a plurality of groups 305, . . . , 307. The number of the groups 305, . . . , 307 is no smaller than the number of synchronous data flows 301, . . . , 303.

For example, the group 305 is configured to have instructions 233, . . . , 243 and memory variables 153, . . . , 175 from some of the data flows 301, . . . , 303. The group 307 has instructions 331 and memory variables 333 from some of the data flows 301, . . . , 303.

For example, since memory variables 153, . . . , 175 are assigned to the group 305, instructions 233, . . . , 243 operating on the data at memory locations represented by the memory variables 153, . . . , 175 can also be assigned to the group 305. However, an instruction operating on data at a memory location represented by a memory variable not in the group 305 is not assigned to the group 305. Some instructions do not operate on memory variables mapped to tile memories for implementation and thus are not restricted by memory variable implementations in their placements.

Each of the groups 305, . . . , 307 is to be implemented on a tile (e.g., 141, 143, . . . , or 145) of a coarse grained reconfigurable array 103 that is used to run the program having the data flows 301, . . . , 303.

The partitioning 309 is configured to implement constraints 315. For example, instructions that share one or more tile memory variables should be placed on a same tile and thus assigned to one or more groups to be implemented on a same tile. For example, no instructions each starting a synchronous flow may be placed on a same tile and thus in one or more groups to be implemented on a same tile. For example, no multiple sibling instructions may be placed on a same tile and thus in one or more groups to be implemented on a same tile.

Optionally, the constraints 315 can include a requirement to balance the instruction groups 305, . . . , 307 to have a similar number of instructions per group.

Optionally, the constraints 315 can include a requirement to balance memory usages of the instruction groups 305, . . . , 307 to have a similar total tile memory utilization per group.

Within each instruction group (e.g., 305), tile memory variables (e.g., 153, . . . 175) are selected such that they can be distributed to tile memory region(s) without exceeding tile memory region size, without creating a tile memory access conflict for any instruction, etc.

Further, the constraints 315 can include hardware considerations to improve performance (e.g., placing neighbors in data flow on groups to be implemented on tiles close to each other).

As a result of the partitioning 309, a memory map 225 is generated to map memory variables (e.g., 153, 175, . . . , 333) to tiles (e.g., 141, 143, . . . , 145) of the coarse grained reconfigurable array 103. The memory map 225 reduces the choices to be explored by a scheduler in scheduling instructions using a brute force approach.

FIG. 12 illustrates the partitioning 309 of the data flows 301, . . . , 303 according to constraints to one set of instruction groups 305, . . . , 307. In general, the same constraints 315 can permit multiple sets of instructions group of the data flows 301, . . . 303 partitioned in different ways.

Each of different sets of instruction groups represents a different portion of a search space of possible choices for scheduling the program 101. Thus, each different set can be used by a scheduler 221 to search for a valid schedule for the running the instructions of the program in the coarse grained reconfigurable array 103. Parallel searches can be performed based on the different sets of instruction programs respectively. After finding multiple valid schedules using different sets of instruction groups, a best performing schedule can be selected for running the program 101.

Figure 13:
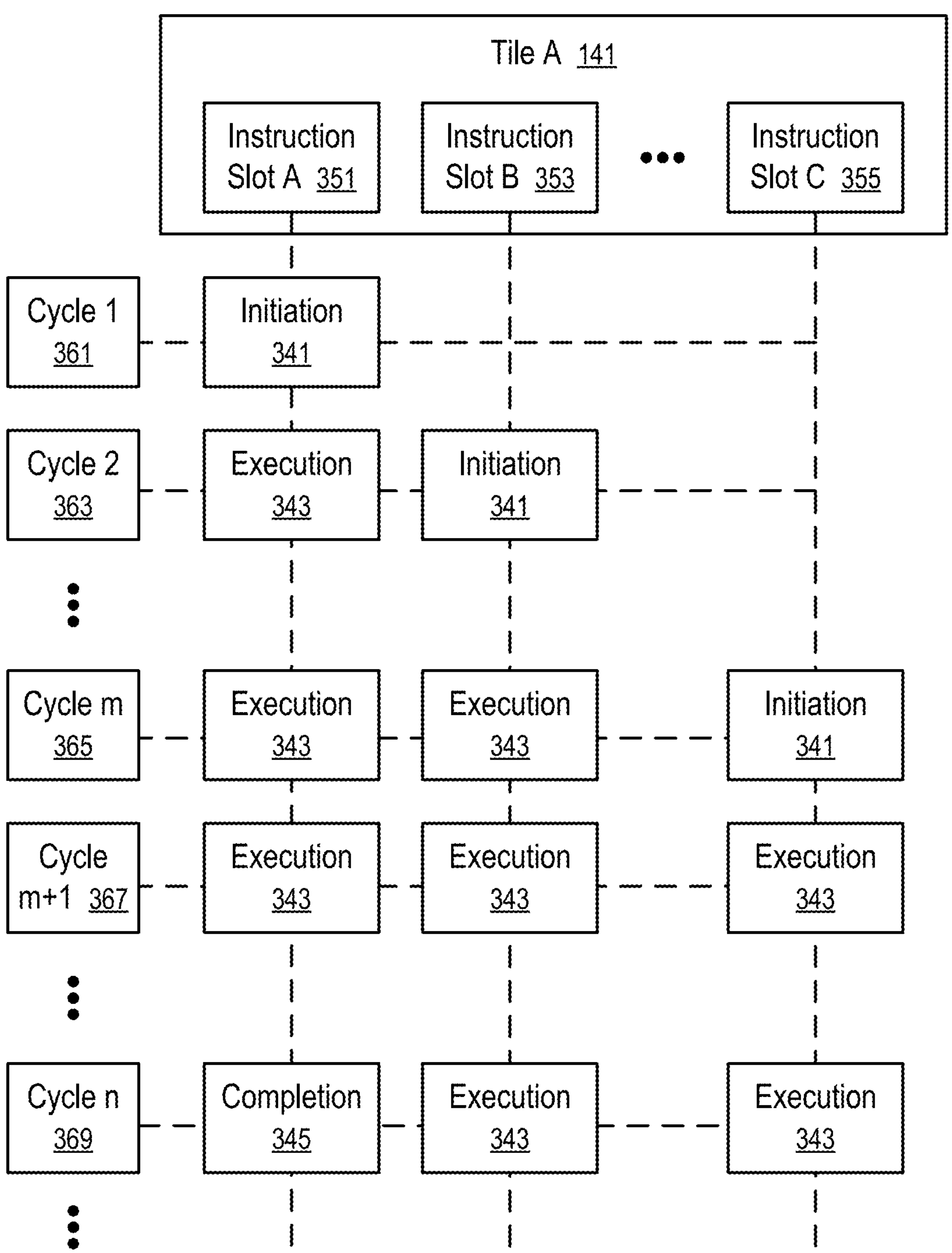
FIG. 13 illustrates instruction slots on a tile available for scheduling an instruction for execution in the tile according to one embodiment.

FIG. 13 illustrates instruction slots on a tile available for scheduling an instruction for execution in the tile according to one embodiment.

In FIG. 13, a tile 141 of a coarse grained reconfigurable array 103 can execute multiple instructions in parallel in different pipelined stages of the computing logic 137 of the tile 141. Instruction slots 351, 353, . . . , 355 are configured to accept different instructions for pipelined execution. The tile 141 can perform initiation 341 of execution of an instruction in slot 351 at a clock cycle 361 in an initial stage of the pipeline. At the next clock cycle 363, execution 343 of the instruction in the slot 351 is performed in the next stage of the pipeline; and the initial stage is available for initiation 341 of execution of the instruction in the next slot 353. Thus, through pipeline operations, the tile can execute the instructions for the slots 351, 353, . . . , 355 in parallel.

For example, at clock cycles 361, 363, . . . , 365, the tile 141 performs initiation 341 of instructions in the slots 351, 353, . . . , 355 respectively. At clock cycle 367, the tiles 141 performs parallel executions 343 for the instructions for the slots 351, 353, . . . , 355 respectively in different pipeline stages of the computing logic 137 of the tile 141. At clock cycle 369, the completion 345 of execution is reached for the instruction in the slot 351, while the tile 141 performs parallel executions 343 for the instructions in the slots 353, . . . 355 respectively. After clock cycle 369, the instruction slot 351 can accept another instruction.

Thus, an instruction assigned to the tile 141 has multiple choices for its execution. For example, the instruction can be placed in one of the slots 351, 353, . . . 355 and scheduled for execution at a permissible clock cycle. For example, if an instruction is scheduled in the slot 351 for execution at cycle 361, a next instruction can be schedule in the slot 353 for execution for at or after cycle 363, or in the slot 355 at or after cycle 365, or in the slot 351 after cycle 369.

For a selected option of scheduling an instruction in a slot (e.g., 351, 353, . . . , or 355) for execution at a clock cycle (e.g., 361, 363, . . . , 365, 367, . . . , or 369), the scheduler 221 can determine whether the timing requirements of connecting outputs to inputs are satisfied at least for the combination of the current instruction and the previous instructions having been scheduled before the current instruction. After finding a valid option of the current instruction, the scheduler 221 can select a next instruction for scheduling, as in FIG. 14.

Figure 14:
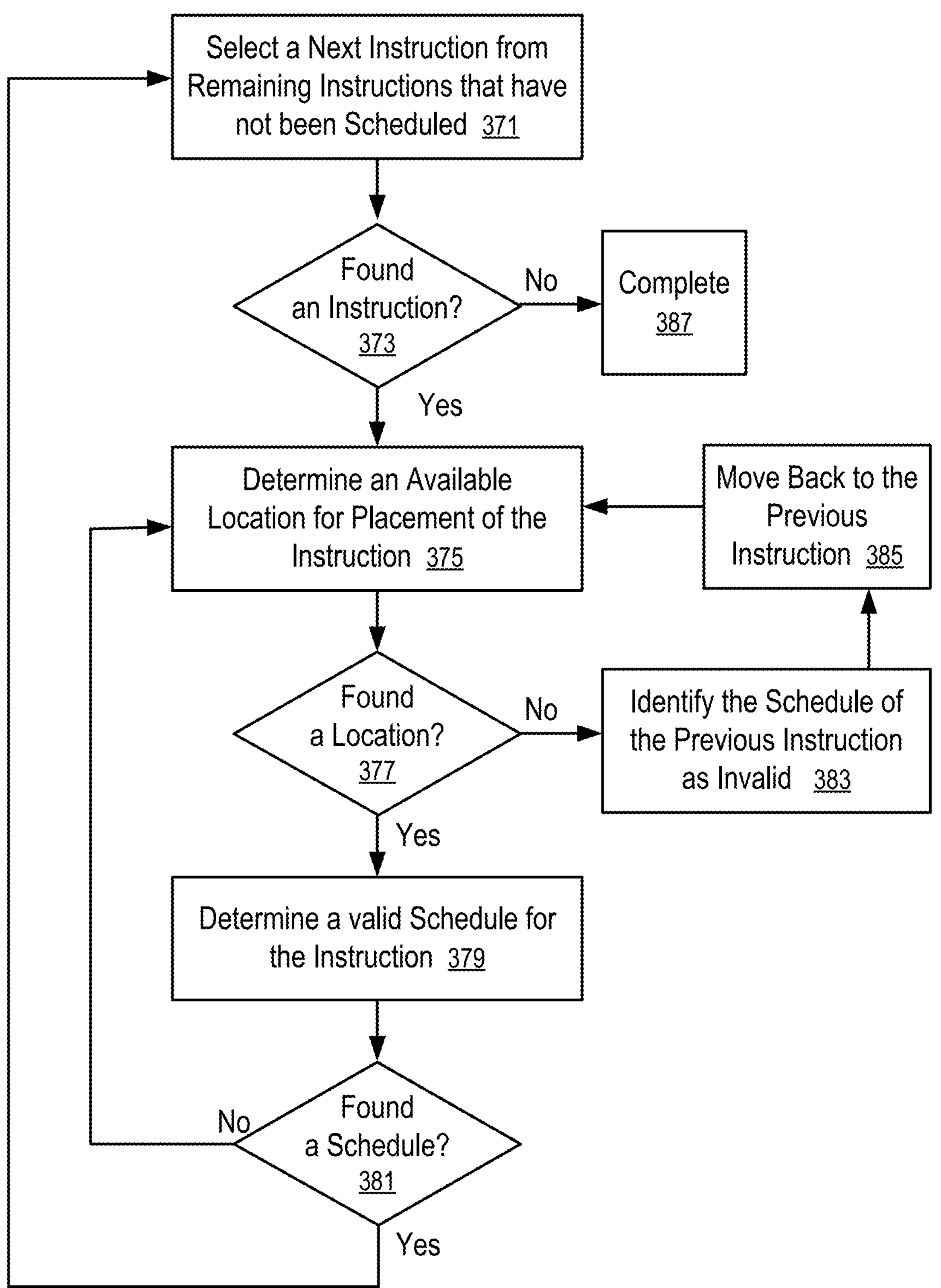
FIG. 14 shows operations to schedule instructions according to one embodiment.

FIG. 14 shows operations to schedule instructions according to one embodiment.

In FIG. 14, the scheduler 221 can select 371 a next instruction from remaining instructions that have not been scheduled. For example, the scheduler 221 can select a next instruction according to an instruction sequence in a data flow (e.g., 301 or 303). For example, the scheduler 221 can randomly select a next instruction.

If it is determined 373 that there is a next instruction to be scheduled, the scheduler 221 can proceed with scheduling the instruction being selected. Otherwise, the scheduler 221 completes 387 the generation of the instruction execution schedule 223.

After the selection of an instruction for scheduling, the scheduler 221 can determine 375 an available location for placement of the instruction.

For example, based on the memory map 225 of mapping the memory variables used by the instruction (e.g., as determined through partitioning 309 as in FIG. 12), the scheduler 221 can identify the tile in which the memory variables are implemented. The instruction is then scheduled for execution in the tile.

As illustrated FIG. 14, the scheduler 221 can further place the instruction in one of the instruction slots of the tile 141.

If it is determined 377 that an available location (e.g., slot) is found, the scheduler 221 can further determine 379 a valid schedule for the instruction.

For example, if the instruction is to be placed in an instruction slot, the scheduler 221 can search for a clock cycle that meets the timing requirement of the tile 141 receiving inputs for the instruction from memory locations that may receive outputs from execution of other instructions.

If the scheduler 221 determines 381 that a valid schedule is found for the instruction, the scheduler 221 can further select 371 a next instruction for scheduling.

However, if the scheduler 221 determines 381 that a valid schedule is found for the current instruction being scheduled, the scheduler 221 can determine 375 an alternative location of the scheduling of the current instruction. If no suitable location can be found for the instruction, the scheduler 221 can identify 383 the schedule of the previous instruction as invalid. Thus, the previous instruction is selected to be rescheduled. The scheduler 221 moves 385 to the previous instruction as the instruction for scheduling.

In determining 375 an available location and determining 379 a valid schedule, the scheduler 221 excludes options that have been previously identified 383 as invalid and/or having been previously evaluated.

The scheduler 221 can continue the loops as shown in FIG. 14 until the instructions of the instruction groups 305, . . . , 307 have been scheduled, or a determination is made that the instructions groups 305, . . . , 307 cannot be properly scheduled.

FIG. 15 shows a method to schedule instructions of an assembly language program for execution on a coarse grained reconfigurable array according to one embodiment.

For example, the method of FIG. 15 can be configured in the scheduler 221 in FIG. 8 and FIG. 9, using the techniques of FIG. 12 to FIG. 14 to provide an instruction execution schedule 223 of FIG. 8.

At block 271, the scheduler 221 receives an assembly language program 101 identifying data flows 301, . . . , 303 through memory locations represented by memory variables 313, . . . , 323 and identifying instructions 311, . . . , 321 configured to transform data in the data flows 301, . . . , 303.

At block 273, the scheduler 221 receives a hardware profile 239 identifying features of a coarse grained reconfigurable array 103 having a plurality of tiles 141, 143, . . . , 145 operable in parallel.

At block 275, the scheduler 221 generates a memory map 225 identifying, for each respective memory variable (e.g., 153 or 175) in the assembly language program 101, one of the tiles (e.g., 141) that contains a memory location represented by the respective memory variable (e.g., 153 or 175).

For example, the scheduler 221 can be configured to generate the memory map 225 by partitioning 309 the memory variables 313, . . . , 323 and the instructions 311, . . . , 321 of the program 101 into a plurality of groups 305, . . . , 307. Each of the groups 305, . . . , 307 are configured to be implemented on one of the tiles 141, 143, . . . , 145. The groups 305, . . . , 307 as partitioned for implementing on the tiles 141, 143, . . . , 145 meet constraints and/or requirements.

For examples, instructions that share one or more tile memory variables are placed in one or more groups to be implemented on a same tile.

For example, no instructions each starting a synchronous flow are placed in one or more groups to be implemented on a same tile.

For example, no multiple sibling instructions are placed in one or more groups to be implemented on a same tile, etc.

For example, the partitioning 309 can be performed to balance a number of instructions implemented per tile, to balance a number of memory variables implemented per tile, and/or to balance an amount of memory usage implemented per tile, etc.

At block 277, the scheduler 221 assigns, based on the memory map 225, the instructions 311, . . . , 321 to the tiles 141, 143, . . . , 145 for execution.

For example, each respective instruction (e.g., 233) among the instructions 311, . . . , 321 is assigned to a tile containing memory variables (e.g., 153, 175) having data to be operated upon by the respective instruction (e.g., 233).

At block 279, the scheduler 221 provides, as an output, an instruction execution schedule 223 identifying timing of execution of the instructions 311, . . . , 321 in the tiles.

For example, the timing of execution of the instructions 311, . . . , 321 can be determined by: selecting 371 a current instruction (e.g., 233) for scheduling; determining 375 an available location via identifying a slot (e.g., 353) in a first tile (e.g., 141) containing memory variables (e.g., 153, 175) used by the current instruction (e.g., 233); and determining 379 a valid schedule for the current instruction (e.g., 233) via searching for a clock cycle (e.g., 231) for execution of the current instruction (e.g., 233) in the slot (e.g., 353).

In response to a determination 381 that a valid spoke RAM slot (e.g., for execution at a valid clock cycle 231) is found for execution of the current instruction, the scheduler 221 can select 371 a next instruction for scheduling.

In response to a determination 381 that no valid spoke RAM slot is found for execution of the current instruction (e.g., 233) in the slot (e.g., 353), the scheduler 221 is configured to search for an available slot in the first tile. In response to such an available slot being found, the scheduler 221 can search for a clock cycle for execution of the current instruction in the available slot.

However, in response to a determination 375 that no available slot is found, the scheduler 221 is configured to: determine a prior instruction scheduled before the current instruction; identify 383 a first schedule previously determined for the prior instruction as invalid; and start determining of/searching for a second valid schedule for the prior instruction.

Different memory maps (e.g., 225) can be generated for the same assembly language program 101; and operations in blocks 277 and 279 can be performed in parallel based on different memory maps to generate different instruction execution schedules (e.g., 223). The scheduler 221 can then evaluate the performance levels of the instruction execution schedules (e.g., 223) (e.g., based on latency, energy consumption, etc.). The best performing schedule can be selected for running the assembly language program 101 on the coarse grained reconfigurable array 103.

Figure 16:
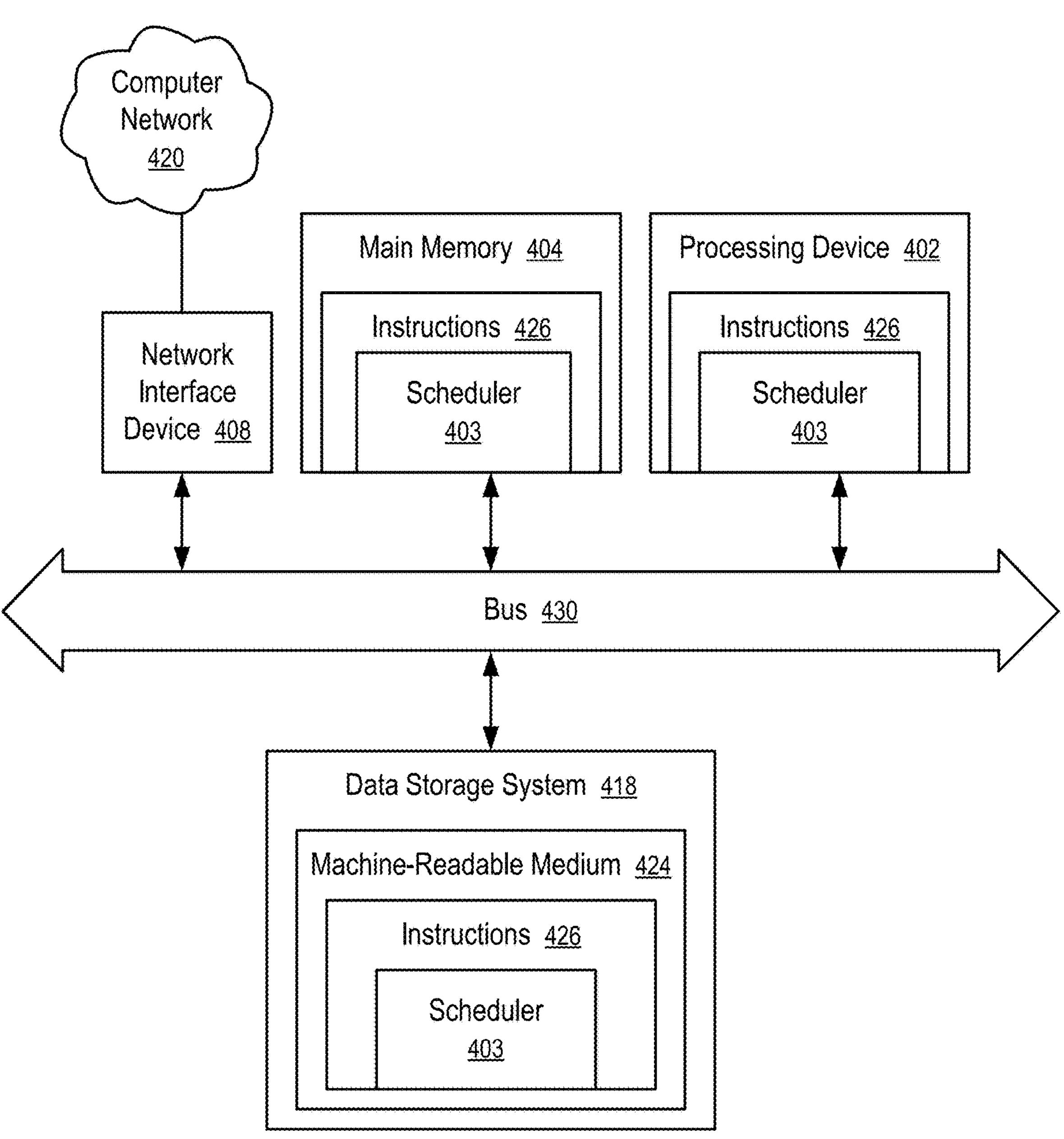
FIG. 16 shows a block diagram of an example computer system in which embodiments of the present disclosure can operate.

FIG. 16 illustrates an example machine of a computer system within which a set of instructions, for causing the machine to perform any one or more of the methodologies discussed herein, can be executed.

The computer system of FIG. 16 can be used to perform the operations of a scheduler 403, to generate an instruction execution schedule 223 to run an assembly language program 101 discussed with reference to FIG. 1-FIG. 15 on a coarse grained reconfigurable array (CGRA) 103, by executing instructions configured to perform the operations corresponding to the scheduler 221.

In some embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 16 includes a processing device 402, a main memory 404, and a data storage system 418, which communicate with each other via a bus 430. For example, the processing device 402 can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus 430 can include, or be replaced with, multiple buses.

The processing device 402 in FIG. 16 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), a network processor, or the like.

The computer system of FIG. 16 can further include a network interface device 408 to communicate over a computer network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system, the main memory 404 and the processing device 402 also constituting machine-readable storage media.

In one embodiment, the instructions 426 include instructions to implement functionality corresponding to a scheduler 403, such as the scheduler 221 for an assembly language program 101 described with reference to FIG. 1 to FIG. 15. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a universal serial bus (USB) adapter for controlling USB peripherals, and/or an IEEE-2394 bus adapter for controlling IEEE-2394 peripherals.

The memory may include one or more of: read only memory (ROM), volatile random access memory (RAM), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., compact disk read-only memory (CD ROM), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device, comprising:
a memory; and
at least one processor configured via instructions stored in the memory to:
receive a program specifying a plurality of memory variables, a plurality of data flows through the memory variables, and first instructions to transform data along the data flows;
receive a profile specifying a coarse grained reconfigurable array having a plurality of tiles operable in parallel, wherein the coarse grained reconfigurable array having latency constraints in propagating data through elements in the tiles;
map the data flows to operations of data through the elements in the tiles;
generate a memory map identifying, for each respective memory variable among the plurality of memory variables, one of the tiles that contains a memory location represented by the respective memory variable;
wherein the data flows are mapped to the operations based on the memory map.

2. The device of claim 1, wherein the at least one processor is further configured to assign, based on the memory map, the first instructions to the tiles.

3. The device of claim 2, wherein the schedule is configured to identify timing of execution of the first instructions in the tiles.

4. The device of claim 3, wherein the at least one processor is further configured to partition the memory variables and the first instructions into a plurality of groups, each of the groups configured to be implemented on one of the tiles.

5. The device of claim 4, wherein the at least one processor is further configured to partition the memory variables and the first instructions to balance a number of instructions implemented per tile, to balance a number of memory variables implemented per tile, or to balance an amount of memory usage implemented per tile.

6. The device of claim 4, wherein the at least one processor is further configured to assign each respective instruction among the first instructions to a tile based on the tile containing memory variables having data to be operated upon by the respective instruction.

7. The device of claim 6, wherein to determine the timing of execution of the first instructions the at least one processor is configured to:
select a current instruction for scheduling;
identify a slot in a first tile containing memory variables used by the current instruction;
search for a clock cycle for execution of the current instruction in the slot; and
select a next instruction for scheduling, in response to a determination that a valid spoke RAM slot is found for execution of the current instruction;
wherein the at least one processor is configured to, if no valid spoke RAM slot is found for execution of the current instruction in the slot:
search for an available slot in the first tile; and
search, in response to the available slot being found, for a clock cycle for execution of the current instruction in the available slot; and
wherein the at least one processor is configured to, if no available slot is found:
determine a prior instruction scheduled before the current instruction;
identify a first schedule previously determined for the prior instruction as invalid; and
start determination of a second valid schedule for the prior instruction.

8. A method, comprising:
receiving a program specifying a plurality of memory variables, a plurality of data flows through the memory variables, and first instructions to transform data along the data flows;
receiving a profile specifying a coarse grained reconfigurable array having a plurality of tiles operable in parallel;
mapping the data flows to operations of data through the elements in the tiles;
determining a schedule to execute the first instructions in the tiles;
receiving the profile specifying a coarse grained reconfigurable array having the plurality of tiles operable in parallel, wherein the coarse grained reconfigurable array includes latency constraints in propagating data through elements in the tiles;
mapping the data flows to operations of propagating data through the elements in the tiles;
determining the schedule to execute the first instructions in the tiles without violating the latency constraints;
generating a memory map identifying, for each respective memory variable among the plurality of memory variables, one of the tiles that contains a memory location represented by the respective memory variable; and
wherein the data flows are mapped to the operations based on the memory map.

9. The method of claim 8, further comprising:
assigning, based on the memory map, the first instructions to the tiles.

10. The method of claim 9, wherein the schedule is configured to identify timing of execution of the first instructions in the tiles.

11. The method of claim 10, further comprising:
partitioning the memory variables and the first instructions into a plurality of groups to implement each of the groups on one of the tiles.

12. The method of claim 11, wherein the partitioning of the memory variables and the first instructions is based on balancing a number of instructions implemented per tile, balancing a number of memory variables implemented per tile, or balancing an amount of memory usage implemented per tile.

13. The method of claim 11, wherein the assigning includes assigning each respective instruction among the first instructions to a tile based on the tile containing memory variables having data to be operated upon by the respective instruction.

14. The method of claim 13, wherein the timing of execution of the first instructions is determined via:
selecting a current instruction for scheduling;
identifying a slot in a first tile containing memory variables used by the current instruction;
searching for a clock cycle for execution of the current instruction in the slot; and selecting a next instruction for scheduling, in response to a determination that a valid spoke RAM slot is found for execution of the current instruction;

wherein if no valid spoke RAM slot is found for execution of the current instruction in the slot, the timing of execution of the first instructions is further determined via:

searching for an available slot in the first tile; and searching, in response to the available slot being found, for a clock cycle for execution of the current instruction in the available slot; and wherein if no available slot is found, the timing of execution of the first instructions is further determined via:

determining a prior instruction scheduled before the current instruction;

identifying a first schedule previously determined for the prior instruction as invalid; and starting determination of a second valid schedule for the prior instruction.

15. A non-transitory computer storage medium storing instructions which, when executed by a computing device, cause the computing device to perform a method, comprising:

receiving a program specifying a plurality of memory variables, a plurality of data flows through the memory variables, and first instructions to transform data along the data flows;

receiving a profile specifying a coarse grained reconfigurable array having a plurality of tiles operable in parallel;

mapping the data flows to operations of data through the elements in the tiles;

determining a schedule to execute the first instructions in the tiles without violating the latency constraints;

receiving the profile specifying a coarse grained reconfigurable array having the plurality of tiles operable in parallel, wherein the coarse grained reconfigurable array includes latency constraints in propagating data through elements in the tiles;

mapping the data flows to operations of propagating data through the elements in the tiles;

determining the schedule to execute the first instructions in the tiles without violating the latency constraints, wherein the schedule is configured to identify timing of execution of the first instructions in the tiles;

generating a memory map identifying, for each respective memory variable among the plurality of memory variables, one of the tiles that contains a memory location represented by the respective memory variable;

wherein the data flows are mapped to the operations based on the memory map.

16. The non-transitory computer storage medium of claim 15, wherein the method further comprises:

assigning, based on the memory map, the first instructions to the tiles.

17. The non-transitory computer storage medium of claim 16, wherein the method further comprises:

partitioning the memory variables and the first instructions into a plurality of groups to implement each of the groups on one of the tiles.

* * * * *